United States Patent
Balcarek et al.

(10) Patent No.: US 12,368,840 B2
(45) Date of Patent: Jul. 22, 2025

(54) SYSTEMS AND METHODS TO CALIBRATE OPTICAL EXTENSOMETERS

(71) Applicant: Illinois Tool Works Inc., Glenview, IL (US)

(72) Inventors: Richard Balcarek, South Easton, MA (US); Martin Allen Peterson, Wrentham, MA (US); Michael Ashman, Natick, MA (US)

(73) Assignee: Illinois Tool Works Inc., Glenview, IL (US)

( * ) Notice: Subject to any disclaimer, the term of this patent is extended or adjusted under 35 U.S.C. 154(b) by 109 days.

(21) Appl. No.: 18/154,536

(22) Filed: Jan. 13, 2023

(65) Prior Publication Data

US 2023/0231990 A1    Jul. 20, 2023

Related U.S. Application Data

(60) Provisional application No. 63/300,044, filed on Jan. 16, 2022.

(51) Int. Cl.
*G02B 7/02* (2021.01)
*G01B 11/16* (2006.01)
(Continued)

(52) U.S. Cl.
CPC ......... *H04N 17/002* (2013.01); *G01B 11/16* (2013.01); *G02B 7/023* (2013.01); *H04N 23/51* (2023.01); *H04N 23/54* (2023.01); *H04N 23/55* (2023.01)

(58) Field of Classification Search
USPC ........................................ 73/760
See application file for complete search history.

(56) References Cited

U.S. PATENT DOCUMENTS 10,551,169 B1 * 2/2020 Womack ............ G01B 21/042
2021/0404929 A1 * 12/2021 Hoehl .................. G01N 3/068

FOREIGN PATENT DOCUMENTS

BR    112021010291 A2 *  6/2021  ............ B33Y 50/00
CN       106124336 B  * 11/2018  ............ G01N 3/068
(Continued)

OTHER PUBLICATIONS

"Calibration Techniques for Extensometry: Possible. Standards of Strain Measurement", Journal of Testing and Evaluation, American Society for Testing and Materials. Philadelphia, US, vol. 21, No. 6, Nov. 1, 1993 (Nov. 1, 1993), pp. 515-521, XP000425273, . ISSN: 0090-3973.*

(Continued)

*Primary Examiner* — Clayton E. LaBalle
*Assistant Examiner* — Warren K Fenwick
(74) *Attorney, Agent, or Firm* — McAndrews, Held & Malloy, Ltd.

(57) ABSTRACT

Disclosed example video extensometers include: a load string configured to secure a test specimen; an imaging device configured to capture images of a surface of the test specimen when secured in the load string; a storage device configured to store a plurality of first calibration parameters corresponding to intrinsic properties of the imaging device; and control circuitry configured to: perform a verification process using the first calibration parameters to verify that a plurality of second calibration parameters correspond to an arrangement of the test specimen with respect to the imaging device; and perform an optical strain measurement process to measure displacement of the test specimen based on the first calibration parameters and the second calibration parameters.

21 Claims, 13 Drawing Sheets

(51) Int. Cl.
*H04N 17/00* (2006.01)
*H04N 23/51* (2023.01)
*H04N 23/54* (2023.01)
*H04N 23/55* (2023.01)

(56) References Cited

FOREIGN PATENT DOCUMENTS

| | | | | |
|---|---|---|---|---|
| CN | 111426280 A | * | 7/2020 | |
| ES | 1063733 U | * | 12/2006 | |
| WO | WO-2014090298 A1 | * | 6/2014 | ............... G01N 3/24 |

OTHER PUBLICATIONS

Watson RB: "Calibration Techniques for Extensometry: Possible Standards of Strain Measurement", Journal of Testing and Evaluation, American Society for Testing and Materials. Philadelphia, US, Re Item IV vol. 21, No. 6, Nov. 1, 1993 (Nov. 1, 1993), pp. 515-521, XP000425273, ISSN: 0090-3973.
Int'l Search Report and Written Opinion Appln No. PCT/US2023/010812 mailed Jun. 30, 2023.

* cited by examiner

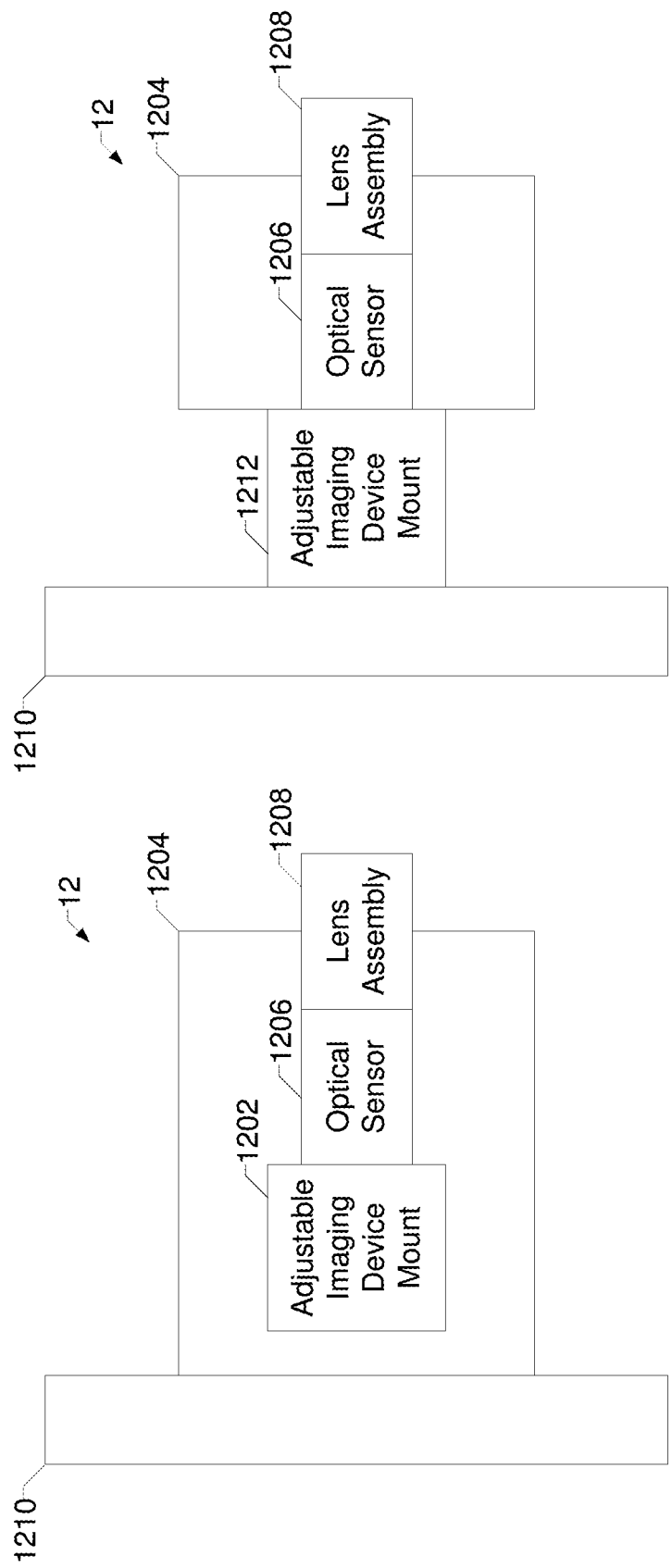

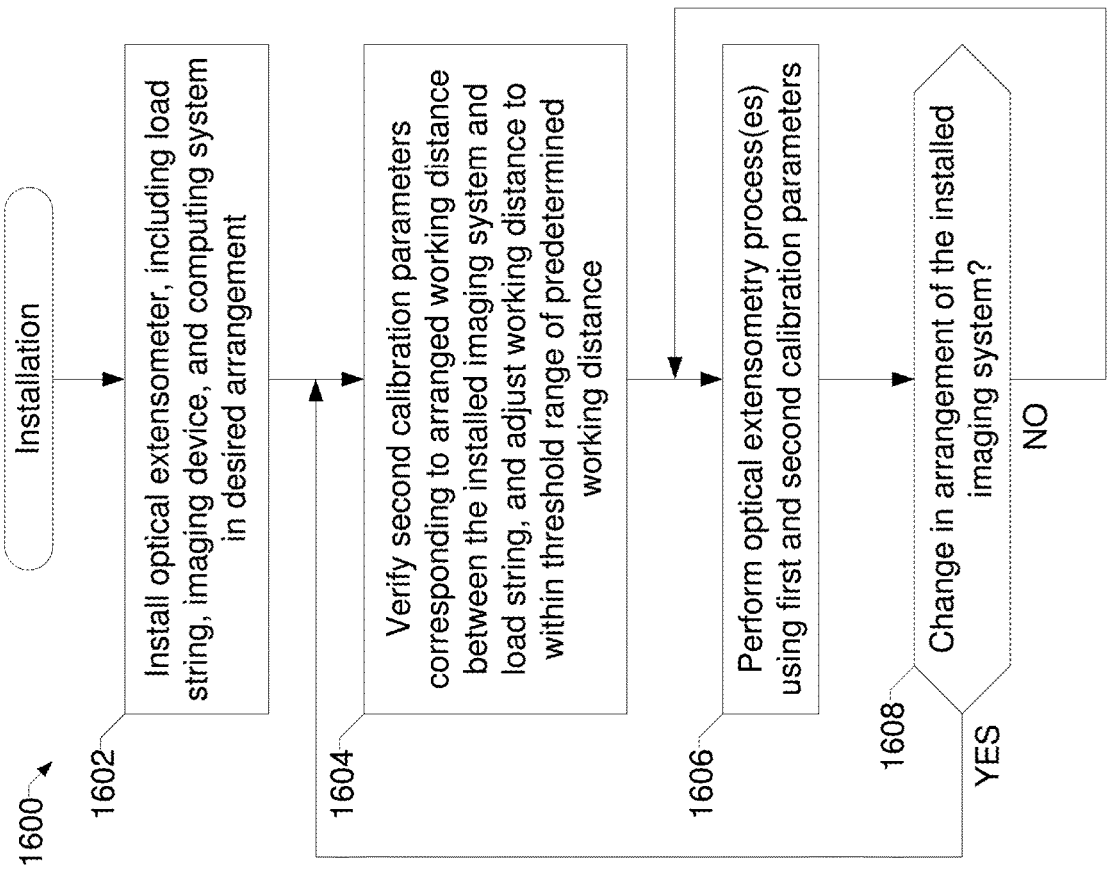

SYSTEMS AND METHODS TO CALIBRATE OPTICAL EXTENSOMETERS

FIELD OF THE DISCLOSURE

This disclosure is directed generally to optical extensometers and, more particularly, to systems and methods to calibrate optical extensometers.

BACKGROUND

Camera based vision systems have been implemented as part of materials testing systems for measurement of specimen elongation and/or strain. These systems collect one or more images of a specimen under test, with these images being synchronized with other signals of interest for the test (e.g., specimen load, machine actuator/crosshead displacement, etc.). The images of the test specimen can be analyzed to locate and track specific features of the specimen as the test progresses. Changes in the location of such features, such as a changes in relative position of one or more reference features of the specimen, allows local specimen deformation to be calculated and, in turn, specimen strain to be computed.

Conventional systems employ cameras or other imaging systems to capture images from which to measure characteristics of the test specimen. However, imaging and/or measurement differences between a perceived reference position and an actual position can lead to distorted readings and inaccurate measurements. Thus, a system to correct for such errors is desirable.

SUMMARY

Systems and methods to calibrate optical extensometers are disclosed, substantially as illustrated by and described in connection with at least one of the figures.

BRIEF DESCRIPTION OF THE DRAWINGS

The benefits and advantages of the present invention will become more readily apparent to those of ordinary skill in the relevant art after reviewing the following detailed description and accompanying drawings, wherein:

FIG. 12A illustrates an example of the imaging device of FIG. 1, including an adjustable imaging device mount attached to an interior of a housing for adjustment of the positioning and/or rotation of an optical sensor and lens assembly of the imaging device.

FIG. 12B illustrates another example of the imaging device of FIG. 1, including an adjustable imaging device mount attached to an exterior of a housing for adjustment of the positioning and/or rotation of an optical sensor and lens assembly of the imaging device.

FIG. 15 is a flowchart representative of an example method which may be performed to determine and store intrinsic and extrinsic calibration parameters for the extensometer system of FIG. 1.

FIG. 16 is a flowchart representative of an example method which may be performed to verify the configuration of the installed optical extensometer system of FIG. 1 based on stored intrinsic and extrinsic calibration parameters.

The figures are not necessarily to scale. Where appropriate, similar or identical reference numbers are used to refer to similar or identical components.

DETAILED DESCRIPTION

Figure 2:
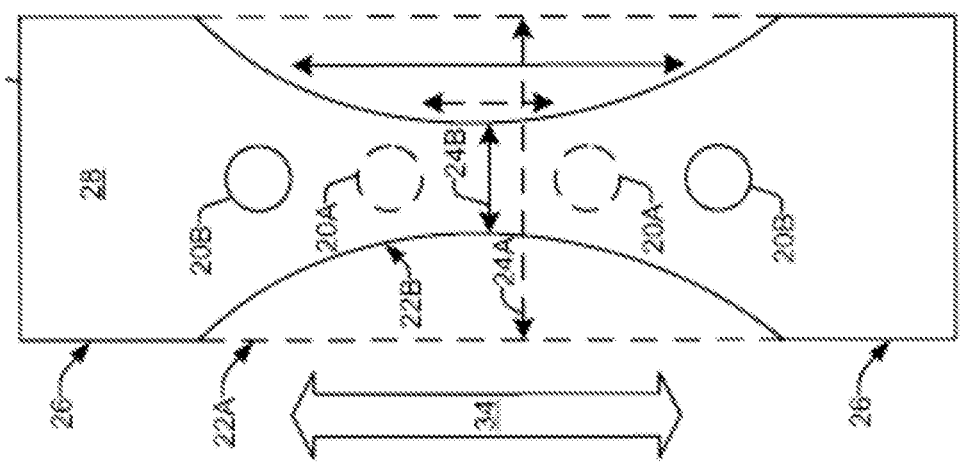
FIG. 2 is an example test specimen for measurement in the extensometer system of FIG. 1, in accordance with aspects of this disclosure.

The present disclosure describes systems and methods to compensate for error in a video extensometer system, including noise, perspective variations, and/or component placement and/or operation.

Conventional systems are subject to one or more errors in testing and measuring one or more physical characteristics of a test specimen. The errors may be attributed to system components limitations (e.g., component physical/operational limitations, operational impacts on associated components, etc.), system calibration (e.g., for measuring different materials/specimens), and/or measurement and/or analytical limitations (e.g., collection and analysis of measured characteristics, etc.).

Some conventional testing systems employ camera based vision systems to capture information (e.g., measurements of one or more characteristics or geometric variable) during a material testing process (e.g., to determine strain of the test specimen). Such systems may capture multiple images of the test specimen and synchronize these images with other information associated with the testing process (e.g., specimen load, machine actuator/crosshead displacement, etc.). The images of the test specimen can then be analyzed via one or more algorithms to identify and/or locate specific features of the test specimen (including reference features), as well as track such features as the testing operation progresses. A change in an absolute and/or relative location of such features allows local specimen deformation to be calculated and, in turn, specimen strain to be computed.

Specimen features of interest may consist of markings (e.g., reference features) applied to a surface of the test specimen visible to the camera(s). For example, a processor can analyze the image to determine the location and/or geometry (and any change thereof) of the markings, and to track these marks as they move relative to one another during the test. Multiple markings may exist on the front face of the specimen—for example pair groupings for determination of gage length-based strain measurement (axial marks, transverse marks etc.), or quasi random speckle patterns used with Digital Image Correlation (DIC) techniques. An alternative set of features that may be of interest for determination of transverse specimen strain are the edges of the test specimen.

For single or multiple camera measurement systems, a calibration process can be performed on a selected calibration plane arranged a predetermined distance from the image sensor. The calibration process establishes the relationship between one or more characteristics (e.g., a size, position, width, etc.) as captured by the imaging device and one or more physical characteristics (e.g., determined in physical coordinates) on the calibration plane.

Conventional calibration processes may employ a calibration reference device positioned on the calibration plane. The reference device includes predetermined physical characteristics with known geometric dimensions associated with covering some or all of the Field of View (FOV) of interest. The calibration process enables the image of the calibration device to be captured and compared to the known calibration device geometry, with a transfer function being established to convert the image co-ordinates from the pixel co-ordinate system to real-world physical co-ordinate system.

Conventional video extensometer systems track and measure dimensions and/or relative location of markings on a surface of the test specimen. During a testing process, image processing algorithms are executed (e.g., via a processor of the video extensometer system) to determine the locations of the markings on the surface of the specimen. Based on the determined locations, the processor may calculate the initial specimen gauge length as well as instantaneous changes in specimen gage length from the value(s) at initiation of the test specimen (e.g., axial and/or transverse strain). The accuracy with which the video extensometer system is able to measure absolute and/or relative positions and/or changes in positions of markings is dependent at least in part on whether the surface of the specimen is coplanar with the calibrated plane. Differences between the locations of the measurement plane (corresponding to the surface of the test specimen) and the calibration plane (corresponding to a reference plane) will produce measurement errors (e.g., perspective errors). As deviations between the measurement and reference planes increase (e.g., along a Z-axis between the test specimen and the camera), larger measurement errors result.

Conventional calibration techniques can be burdensome to the operator of the video extensometer system, at least in part due to the types of changes in the system that can result in a re-calibration being required to maintain accuracy. While some conventional systems make the calibration process relatively quick and easy to perform when configured for calibration, the process of installing the required calibration hardware may also be burdensome.

Disclosed example video extensometers reduce the calibration and re-calibration burden on operators by performing at least a portion of the calibration prior to installation. To maintain the validity of this calibration, disclosed systems and methods provide lenses which are mounted to the video extensometer in a manner that provides consistency of position and orientation, regardless of differences in operator skill or capability. Disclosed example video extensometers further reduce calibration burden by reducing the types of events which can provoke a recalibration, and by reducing the burden of the recalibrations themselves by using a smaller, simpler calibration reference.

Disclosed example optical extensometers include: a load string configured to secure a test specimen; an imaging device configured to capture images of a surface of the test specimen when secured in the load string; a storage device configured to store a plurality of first calibration parameters corresponding to intrinsic properties of the imaging device; and control circuitry configured to: perform a verification process using the first calibration parameters to verify that a plurality of second calibration parameters correspond to an arrangement of the test specimen with respect to the imaging device; and perform an optical strain measurement process to measure displacement of the test specimen based on the first calibration parameters and the second calibration parameters.

In some example optical extensometers, the imaging device includes a housing, an image sensor within the housing, and a lens configured to attach to the housing using a kinematic mount. In some example optical extensometers, the kinematic mount is configured to reproduce a position and orientation of the lens corresponding to a calibration procedure associated with generation of the first calibration parameters. In some example optical extensometers, the kinematic mount includes: a base, comprising a plurality of seats; and a lens mount, comprising a plurality of bearings having a complementary arrangement to the plurality of seats. In some example optical extensometers, the base and the lens mount further include complementary keying to prevent mismatching of the plurality of bearings with the plurality of seats. In some example optical extensometers, the base includes a plurality of first magnets, and the lens mount includes a plurality of second magnets configured to interact with the first magnets to mate the plurality of bearings to the plurality of seats.

Some example optical extensometers further include an adjustable imaging device mount configured to enable adjustment of a working distance between the imaging device and the load string. In some example optical extensometers, the imaging device includes a housing, an optical sensor within the housing, and a lens mount having a fixed distance to the optical sensor, in which the adjustable imaging device mount is attached to an exterior of the housing. In some example optical extensometers, the imaging device includes a housing, an optical sensor within the housing, and a lens mount having a fixed distance to the optical sensor, in which the adjustable imaging device mount is attached to an interior of the housing and is configured to adjust a position of the optical sensor and the lens mount. In some example optical extensometers, the control circuitry is configured to perform the verification process and output a signal indicating whether the working distance is within a threshold range of one or more predetermined working distances.

In some example optical extensometers, the control circuitry is configured to select, based on performing the verification process, one of a plurality of sets of the second calibration parameters stored in the storage device corresponding to a plurality of predetermined working distances. In some example optical extensometers, the control circuitry is configured to calculate the second calibration parameters based on the first calibration parameters and using a predetermined verification specimen attached to the load string.

In some example optical extensometers, the intrinsic properties of the imaging device include one or more of: a focal length, an optical center, a distortion parameter, a pixel size, or a pixel skew parameter. In some example optical extensometers, the second calibration parameters include a relative position of the imaging device and the load string with respect to a reference position, and a relative rotation of the imaging device and the load string with respect to a reference orientation. In some example optical extensometers, the control circuitry is configured to perform the verification process based on a predetermined calibration plate placed in the load string. In some example optical extensometers, the control circuitry is configured to perform the verification process based on reference markers installed on the load string. Some example optical extensometers further include an adjustable imaging device mount configured to enable adjustment of a focal distance by adjusting a distance between a lens and an optical sensor of the imaging device, the adjustable imaging device mount comprising a plurality of discrete adjustment points.

Other disclosed example optical extensometers include: a load string configured to secure a test specimen; an imaging device configured to capture images of a surface of the test specimen when secured in the load string; a storage device configured to store a plurality of first calibration parameters corresponding to intrinsic properties of the imaging device; and control circuitry configured to: perform a calibration process using the first calibration parameters to calculate a plurality of second calibration parameters based on an arrangement of the test specimen with respect to the imaging device; and perform an optical extensometer process to measure displacement of the test specimen based on the first calibration parameters and the second calibration parameters.

In some example optical extensometers, the imaging device includes a housing, an image sensor within the housing, and a lens configured to attach to the housing using a kinematic mount configured to reproduce a position and orientation of the lens corresponding to a calibration procedure associated with generation of the first calibration parameters. In some example optical extensometers, the kinematic mount includes a base, having a plurality of seats and a plurality of first magnets; and a lens mount, having a plurality of bearings having a complementary arrangement to the plurality of seats, and a plurality of second magnets configured to interact with the first magnets to mate the plurality of bearings to the corresponding ones of the plurality of seats.

In some example optical extensometers, the control circuitry is configured to calculate the second calibration parameters based on a first calibration plate that has a different set of visible features than a second calibration plate used to determine and store the first calibration parameters. In some example optical extensometers, the intrinsic properties of the imaging device include one or more of: a focal length, an optical center, a distortion parameter, a pixel size, or a pixel skew parameter. In some example optical extensometers, the second calibration parameters include a relative position of the imaging device and the load string with respect to a reference position, and a relative rotation of the imaging device and the load string with respect to a reference orientation.

Figure 1:
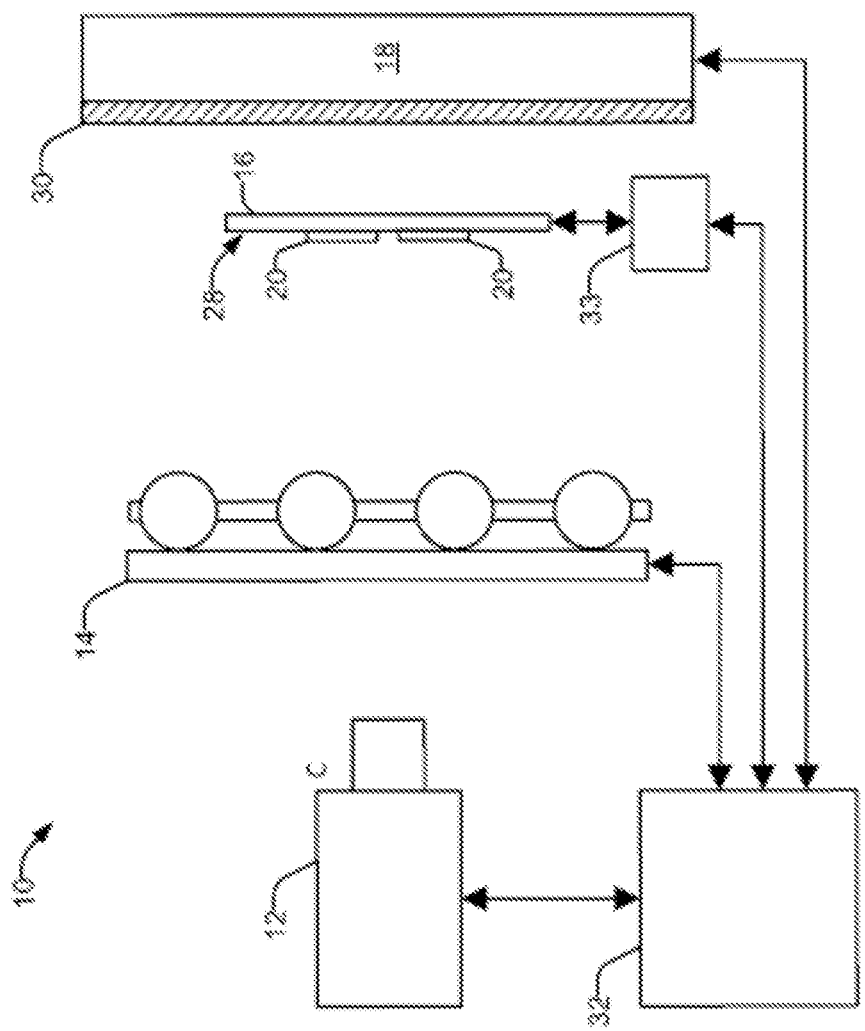
FIG. 1 is a block diagram of an example extensometer system, in accordance with aspects of this disclosure.

Referring now to the figures, FIG. 1 is an example optical extensometer system 10 to measure changes to one or more characteristics of a test specimen 16 undergoing a mechanical property testing. The example extensometer system 10 may be connected to, for example, a testing system 33 (e.g., a load string) capable of mechanically stressing the test specimen 16. The extensometer system 10 may measure and/or calculate changes in the test specimen 16 subjected to, for example, compression strength testing, tension strength testing, shear strength testing, bend strength testing, deflection strength testing, tearing strength testing, peel strength testing (e.g., strength of an adhesive bond), torsional strength testing, and/or any other compressive and/or tensile testing. Additionally, or alternatively, the extensometer system 10 may perform dynamic testing.

Figure 4:
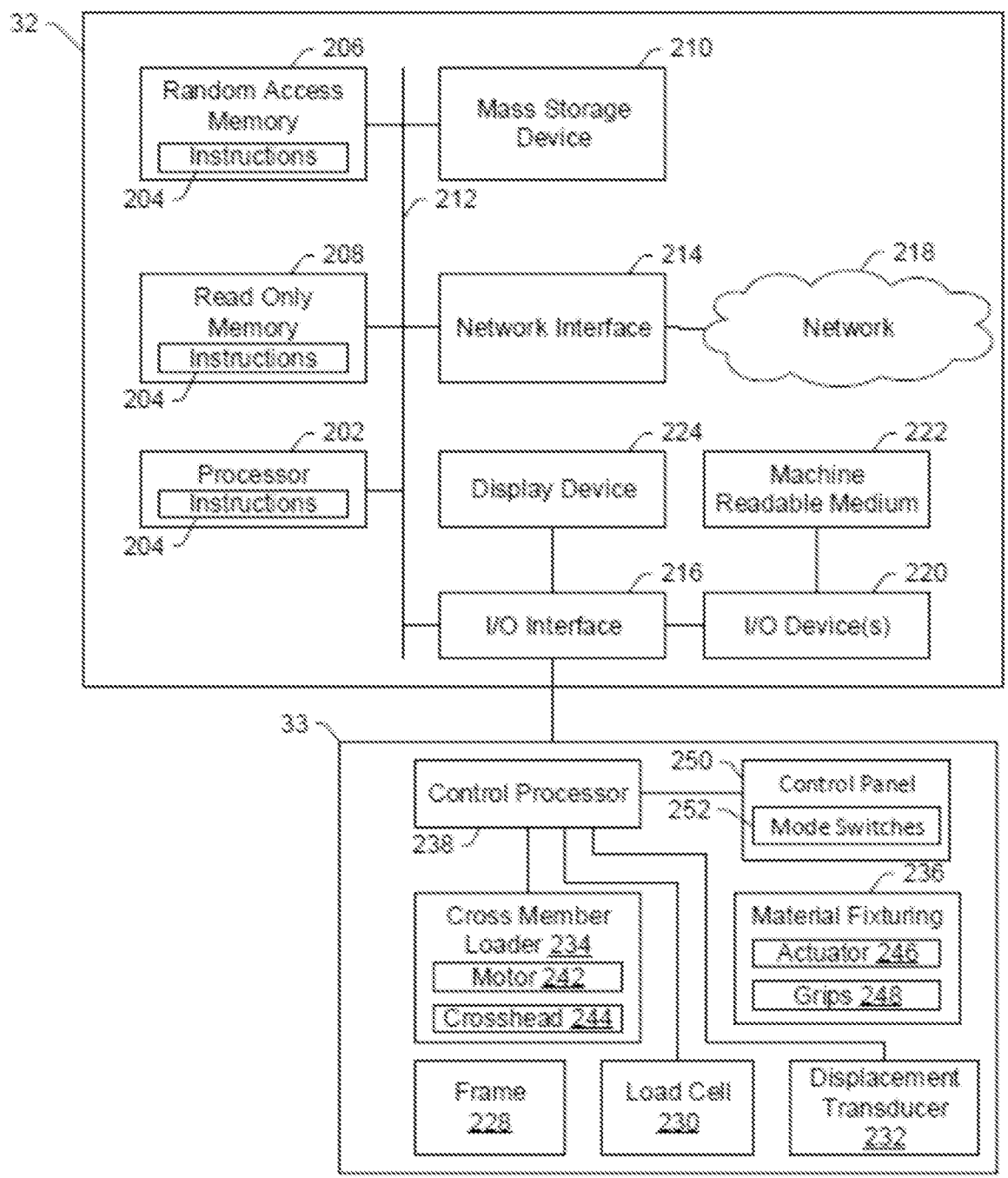
FIG. 4 is a block diagram of an example implementation of the extensometer system of FIG. 1, in accordance with aspects of this disclosure.

In accordance with disclosed examples, the extensometer system 10 may include the testing system 33 for manipulating and testing the test specimen 16, and/or a computing device 32 (e.g., a processing system) communicatively coupled to the testing system 33, the light source, and/or the imaging device, as further shown in FIG. 4. The testing system 33 applies loads to the test specimen 16 and measures the mechanical properties of the test, such as displacement of the test specimen 16 and/or force applied to the test specimen 16.

The extensometer system 10 includes a remote and/or an integral light source 14 (e.g., an LED array) to illuminate the test specimen 16 and/or a reflective back screen 18. The extensometer system 10 includes a computing device 32 (see also FIG. 4) and a camera or imaging device 12. Although the example of FIG. 1 illustrates an imaging device 12 having a single camera, disclosed examples are applicable to multiple-camera extensometer systems 10. In some examples, the light source 14 and the imaging device 12 are configured to transmit and receive in one or more desired wavelengths (e.g., visible wavelengths, infrared wavelengths, ultraviolet wavelengths, etc.); however, other illumination sources and/or wavelengths are similarly applicable. In some examples, one or both of the light source 14 or the imaging device 12 include one or more filters (e.g., a polarizing filter), one or more lenses. In some examples, a calibration routine is performed (e.g., a two-dimensional calibration routine) to identify one or more characteristics of the test specimen 16, one or more markers 20 (including a pattern of markers), is additionally used.

In disclosed examples, the computing device 32 may be used to configure the testing system 33, control the testing system 33, and/or receive measurement data (e.g., transducer measurements such as force and displacement) and/or test results (e.g., peak force, break displacement, etc.) from the testing system 33 for processing, display, reporting, and/or any other desired purposes. The extensometer system 10 connects to the testing system 33 and software utilizing any standard interfaces, such as USB 1.0, USB 1.1, USB 2.0, USB 3.0, Ethernet, analog, encoder, or SPI, and/or any other standard and/or custom interface. The use of standard interfaces allows the extensometer system 10 to be plugged into and used by existing systems without the need for specialized integration software or hardware. The extensometer system 10 provides axial and transverse encoder or analog information in real-time to the testing system 33. Real-time optical extensometer 10 and materials testing machine 33 exchange real-time test data, including extension/strain data, with the computing device 32, which may be configured via a wired and/or wireless communications channel. The extensometer system 10 provides measurement and/or calculation of extension/strain data captured from the test specimen 16 subjected to testing in the testing system 33, which in turn, provides stress and extension/strain data to the computing device 32.

As disclosed herein, the captured images are input to the computing device 32 from the imaging device, where one or more algorithms and/or look up tables are employed to calculate multiple axes of extension/strain values for the test specimen 16 (i.e., the change or percentage change in inter-target distance as calculated by image monitoring of the markers 20 affixed to the test specimen 16). Following computation, the data may be stored in memory or output to a network and/or one or more display devices, I/O devices, etc. (see also FIG. 4).

FIG. 2 is an example test specimen 16 for measurement in the extensometer system 10 of FIG. 1. For example, one or more markings 20 (e.g., reference features) are applied to the surface 28 facing the light source 14 and imaging device 12. Grip sections 26 are configured for placement within a grip of the testing system 33 (see also FIG. 4), and apply force to the test specimen 16. For example, a cross-member loader applies force to the specimen 16 under test, while the grips grasp or otherwise couple the test specimen 16 to the testing system 33. A force applicator such as a motor causes the crosshead to move with respect to the frame to apply force to the test specimen 16, as illustrated by double arrow 34. Forces 34 pulling the grip sections 26 away from one another may elongate the test specimen 16, resulting in the markings moving from a first position 20A to a second position 20B. Additionally or alternatively, the markings may change shape or size, which may also be measured by the computing device 32 in view of the captured images. The forces 34 may also cause the edges of the test specimen to move from a first position 22A to a second position 22B. For example, at the first or initial position, the edges have a width 24A, which is reduced to width 24B upon application of the forces 34.

Based on the captured images, the computing device 32 is configured to implement an extension/strain on measurement process. For example, to detect an extension/strain on the test specimen 16, the computing device 32 monitors the images provided via the imaging device 12. When the computing device 32 identifies a change in relative position between two or more of the markers and/or the edges of the test specimen 16 (e.g., compared to an initial location at a beginning of movement of the crosshead), the computing device 32 measures the amount of change to calculate the amount of extension and/or strain on the test specimen 16. As disclosed herein, the markers are configured to reflect light from the light source to the camera, whereas the back screen reflects light to create a dark silhouette for edge analysis.

As disclosed herein, the optical extensometer system 10 is configured to perform optical width measurement of non-transparent test specimen 16. The imaging device 12 is arranged to observe the surface 28 of the test specimen 16 that is facing the imaging device 12, the surface 28 being close to a focal plane of the imaging device optics (see, e.g., FIG. 3).

Figure 3:
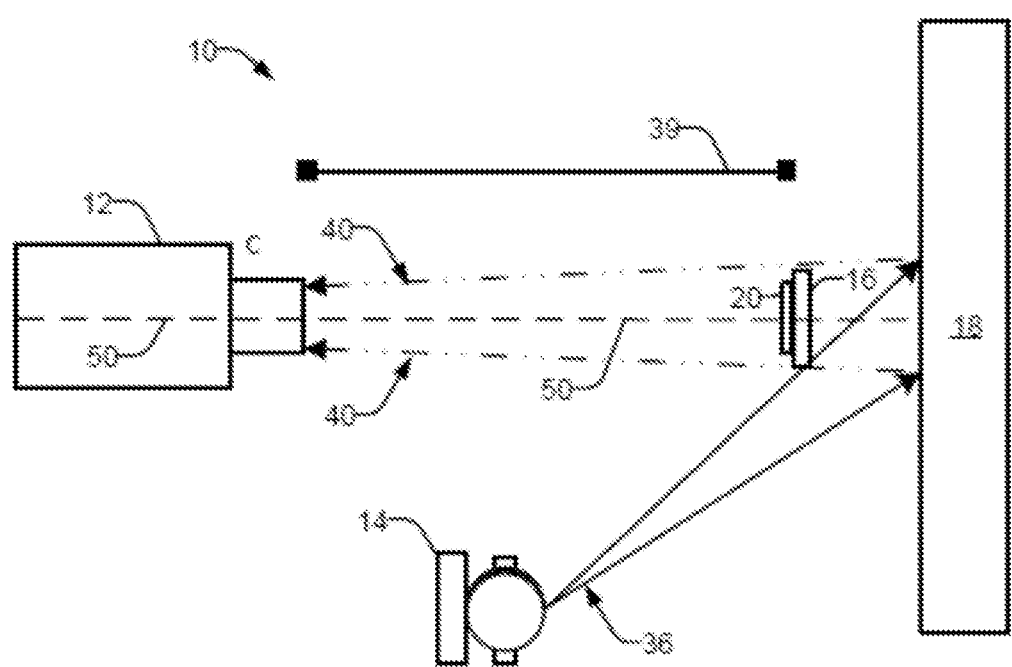
FIG. 3 is a block diagram of an alternate view of the example extensometer system of FIG. 1, in accordance with aspects of this disclosure.

As show in FIG. 3, an optical extensometer system 10 is arranged to measure one or both of axial strain (based on changes in markers 20 and/or a pattern of markers on the test specimen 16 front surface 28), and transverse strain (calculated from changes in width of the specimen 16). The components of the optical extensometer system 10 are shown in a top perspective in FIG. 3, with general locations of each component relative to the others. As shown, the components include an imaging device 12 (e.g., a video camera) configured to capture one or more images of the test specimen 16 during the physical test (e.g., at regular intervals, continuously, and/or based on one or more threshold values associated with time, force, or other suitable test characteristic).

As shown, the imaging device 12 and test specimen 16 are arranged at a working distance or Z-axis distance 39, which during the testing process may be static, predetermined, and/or changing.

The test specimen 16 features suitable marks or reference features 20 on the front facing surface 28 (and/or opposing surface) of the test specimen 16. Analysis of the one or more images associated with the optical extensometer system 10 is implemented via computing device 32 to perform identification algorithms that allow both the test specimen 16 markings 20 and the test specimen edges 22 to be continuously tracked and measured during the test process.

In the illustrated example, the imaging device 12 is a single view camera with a single optical axis 50. In some examples, two or more imaging devices may be employed, which may be collocated and/or arranged with different viewing angles of the testing specimen 16. By employing stereo imaging arrangements, measurement variables associated with perspective and/or depth of multiple dimensions of the test specimen 16 may also be used to further calibrate and/or measure characteristics of the test specimen 16.

In some examples, the optical extensometer system 10 can measure Z-axis movement by analyzing changes associated with a feature of the test specimen that is independent of deformation of the test specimen. For instance, an image or other feature can be projected onto the surface of the specimen under test. For example, a laser and/or other type of projector can projecting a feature (e.g., dot, line, pattern, etc.). The imaging device 12 can measure Z-axis movement by measuring changes and/or displacement of the projected feature, such as by using a known angle α between the projected light and the surface of the test specimen.

In some examples, the measurements and/or position of the one or more edges are provided in pixel coordinates, as captured by the imaging device 12. Additionally or alternatively, the measurements and/or position of the one or more edges are provided in other standard coordinate systems/units, such as meters. In such an example, a calibration process can be implemented to determine absolute and/or relative placement and/or dimensions of the test specimen within the test system prior to measurement, and a similar coordinate system/units can be employed during a testing process.

FIG. 4 is a block diagram of an example extensometer system 10 of FIG. 1. As shown in FIG. 1, the extensometer system 10 includes the testing system 33 and the computing device 32. The example computing device 32 may be a general-purpose computer, a laptop computer, a tablet computer, a mobile device, a server, an all-in-one computer, and/or any other type of computing device. The computing device 32 of FIG. 4 includes a processor 202, which may be a general-purpose central processing unit (CPU). In some examples, the processor 202 may include one or more specialized processing units, such as FPGA, RISC processors with an ARM core, graphic processing units, digital signal processors, and/or system-on-chips (SoC). The processor 202 executes machine-readable instructions 204 that may be stored locally at the processor (e.g., in an included cache or SoC), in a random access memory 206 (or other volatile memory), in a read-only memory 208 (or other non-volatile memory such as FLASH memory), and/or in a mass storage device 210. The example mass storage device 210 may be a hard drive, a solid-state storage drive, a hybrid drive, a RAID array, and/or any other mass data storage device. A bus 212 enables communications between the processor 202, the RAM 206, the ROM 208, the mass storage device 210, a network interface 214, and/or an input/output interface 216.

An example network interface 214 includes hardware, firmware, and/or software to connect the computing device 32 to a communications network 218 such as the Internet. For example, the network interface 214 may include IEEE 202.X-compliant wireless and/or wired communications hardware for transmitting and/or receiving communications.

An example I/O interface 216 of FIG. 4 includes hardware, firmware, and/or software to connect one or more input/output devices 220 to the processor 202 for providing input to the processor 202 and/or providing output from the processor 202. For example, the I/O interface 216 may include a graphics-processing unit for interfacing with a display device, a universal serial bus port for interfacing with one or more USB-compliant devices, a FireWire, a field bus, and/or any other type of interface. The example extensometer system 10 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The computing device 32 may access a non-transitory machine-readable medium 222 via the I/O interface 216 and/or the I/O device(s) 220. Examples of the machine-readable medium 222 of FIG. 4 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine-readable media.

The extensometer system 10 further includes the testing system 33 coupled to the computing device 32. In the example of FIG. 4, the testing system 33 is coupled to the computing device via the I/O interface 216, such as via a USB port, a Thunderbolt port, a FireWire (IEEE 1394) port, and/or any other type serial or parallel data port. In some examples, the testing system 33 is coupled to the network interface 214 and/or to the I/O interface 216 via a wired or wireless connection (e.g., Ethernet, Wi-Fi, etc.), either directly or via the network 218.

The testing system 33 includes a frame 228, a load cell 230, a displacement transducer 232, a cross-member loader 234, material fixtures 236, and a control processor 238. The frame 228 provides rigid structural support for the other components of the testing system 33 that perform the test. The load cell 230 measures force applied to a material under test by the cross-member loader 234 via the grips 248. The testing system 33 may include any other types of transducers for measuring force, displacement, strain, and/or any other desired variables.

The cross-member loader 234 applies force to the material under test, while the material fixtures 236 (also referred to as grips) grasp or otherwise couple the material under test to the cross-member loader 234. The example cross-member loader 234 includes a motor 242 (or other actuator) and a crosshead 244. As used herein, a "crosshead" refers to a component of a material testing system that applies directional (axial) and/or rotational force to a specimen. A material testing system may have one or more crossheads, and the crosshead(s) may be located in any appropriate position and/or orientation in the material testing system. The crosshead 244 couples the material fixtures 236 to the frame 228, and the motor 242 causes the crosshead to move with respect to the frame to position the material fixtures 236 and/or to apply force to the material under test. Example actuators that may be used to provide force and/or motion of a component of the extensometer system 10 include electric motors, pneumatic actuators, hydraulic actuators, piezoelectric actuators, relays, and/or switches.

While the example testing system 33 uses a motor 242, such as a servo or direct-drive linear motor, other systems may use different types of actuators. For example, hydraulic actuators, pneumatic actuators, and/or any other type of actuator may be used based on the requirements of the system.

Example grips 236 include compression platens, jaws or other types of fixtures, depending on the mechanical property being tested and/or the material under test. The grips 236 may be manually configured, controlled via manual input, and/or automatically controlled by the control processor 238. The crosshead 244 and the grips 236 are operator-accessible components.

The extensometer system 10 may further include one or more control panels 250, including one or more mode switches 252. The mode switches 252 may include buttons, switches, and/or other input devices located on an operator control panel. For example, the mode switches 252 may include buttons that control the motor 242 to jog (e.g., position) the crosshead 244 at a particular position on the frame 228, switches (e.g., foot switches) that control the grip actuators 246 to close or open the pneumatic grips 248, and/or any other input devices to control operation of the testing system 33.

The example control processor 238 communicates with the computing device 32 to, for example, receive test parameters from the computing device 32 and/or report measurements and/or other results to the computing device 32. For example, the control processor 238 may include one or more communication or I/O interfaces to enable communication with the computing device 32. The control processor 238 may control the cross-member loader 234 to increase or decrease applied force, control the fixture(s) 236 to grasp or release a material under test, and/or receive measurements from the displacement transducer 232, the load cell 230 and/or other transducers.

The example control processor 238 is configured to implement an extension/strain measurement process when a test specimen 16 is subjected to testing in the testing system 33. For example, to detect an extension/strain on the test specimen 16, the control processor 238 monitors the images provided via the imaging device 12. When the control processor 238 identifies a change in location and/or position of the edges 22 of the test specimen 16 (e.g., compared to an initial location at a beginning of movement of the crosshead 244), the control processor 238 measures the amount of change to calculate the amount of extension and/or strain on the test specimen 16. For example, real-time video provided by the imaging device 12 captures the absolute position of edges 22, and monitors their relative movement over the course of the several images to calculate extension/strain in real time. The stress data and the strain data exchanged among the real-time optical extensometer 10, the testing system 33 and the computing device 32, and typically organized and displayed via the display device 224.

Conventional video extensometer systems require calibration by the operator to control for intrinsic and/or extrinsic variables that may affect measurements by the video extensometer. In some conventional systems, the operator was encouraged or required to re-calibrate the video extensometer in response to certain (or any) changes in the system, such as a change of lens, change of focus, or change in positioning. In some such systems, calibration could be time consuming and/or cumbersome by requiring installation of a specific calibration plate into a load string. In other conventional video extensometer systems, the video extensometer may be calibrated for a particular working distance, and emits a visual aid such as a visible pattern, to allow the operator to visually identify when the calibrated working distance is achieved. However, such visual aids may rely on an operator to correctly interpret the visual aids to configure the calibrated working distance.

As described in more detail below, disclosed examples of the optical extensometer 10 reduce or eliminate the calibration burden on the operator by calibrating all or a portion of the required parameters during manufacturing, and maintaining the calibrated state of the optical extensometer 10 after delivery. Factors for which the optical extensometer 10 may be calibrated include intrinsic properties of the optical extensometer 10 and extrinsic properties involving the configuration of optical extensometer 10. Example intrinsic properties include a focal length of the imaging device 12, an optical center of the imaging device 12, distortion parameter(s), pixel size(s) of the imaging device 12, and/or parameter(s) representative of pixel skew in the imaging device 12. Example extrinsic properties include a relative position (e.g., X, Y, Z position) of the imaging device 12 and the load string with respect to a reference position, and a relative rotation of the imaging device 12 and the load string with respect to a reference orientation.

In some examples, a split calibration approach involves calibrating parameters corresponding to intrinsic properties of the optical extensometer 10 prior to delivery to the operator (e.g., at the factory, by the manufacturer or reseller, etc.), and storing the calibrated parameters in a storage device (e.g., the RAM 206, the ROM 208, the mass storage device 210, the machine readable medium 222, etc.) of the optical extensometer 10. After the optical extensometer 10 is delivered to the operator and installed, the extrinsic properties may then be more easily calibrated by the operator.

Upon installation and configuration, example optical extensometers 10 permit use of a verification plate, which is simpler, smaller, and easier to use than conventional calibration plates. Because the intrinsic calibration parameters are already stored on the optical extensometer 10 prior to installation, the intrinsic calibration parameters may be used to determine the extrinsic calibration parameters using the simpler and/or smaller verification plate.

Figure 5A:
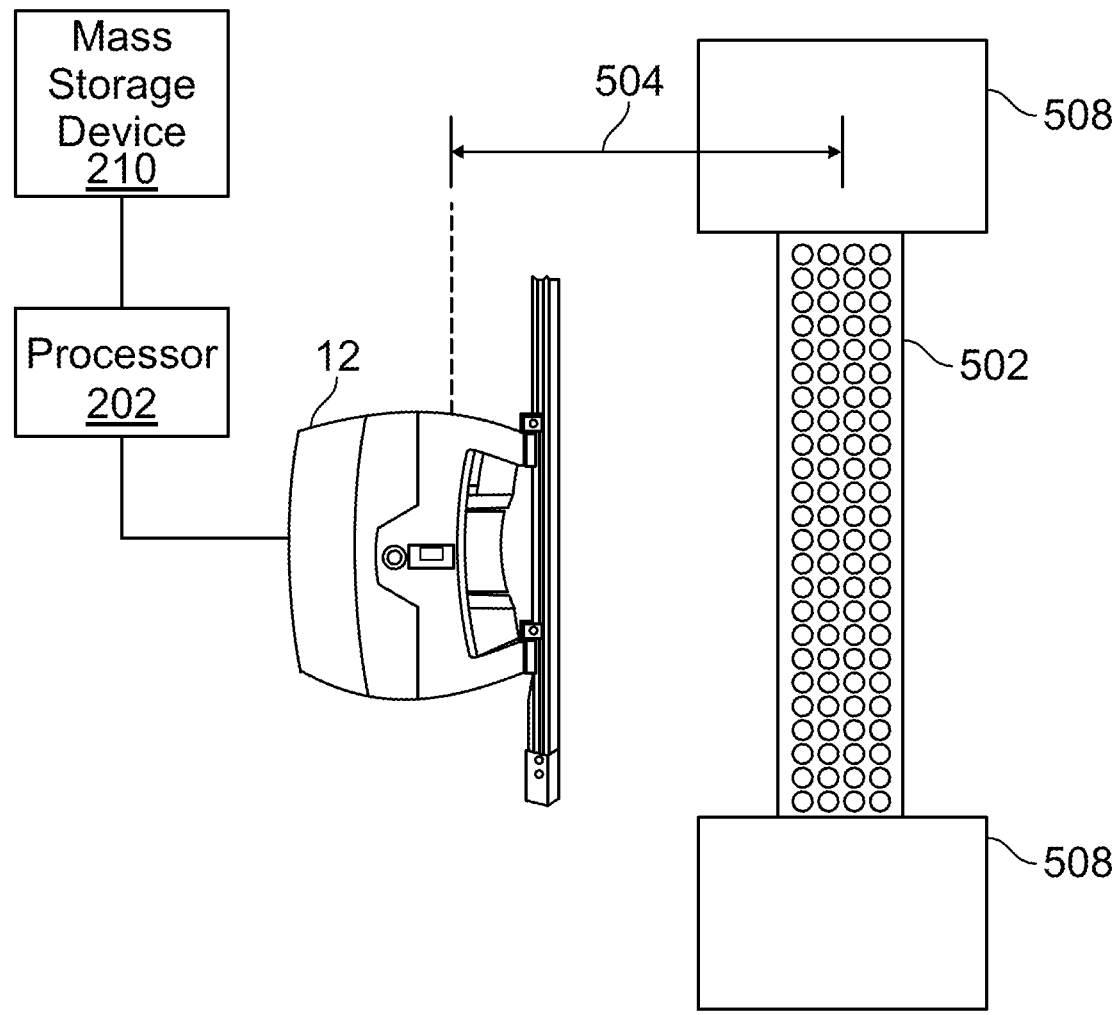
FIG. 5A illustrates an example arrangement of the imaging device of FIG. 1 and a calibration plate that may be used to calibrate the optical extensometer system for intrinsic properties and to store the resulting calibration parameters.

FIG. 5A illustrates an example arrangement of the imaging device 12 and a calibration plate 502 that may be used to calibrate the optical extensometer system 10 for intrinsic properties and to store calibration parameters. The example imaging device 12 is positioned at a known working distance 504 from the calibration plate 502. The calibration process illustrated in FIG. 5A is performed prior to delivery and installation of the optical extensometer 10. The calibration process may be similar to conventional calibration processes, such as observing a pattern of markers having known spacing and sizes on the calibration plate 502, and calculating the appropriate parameters to compensate for focal length, optical center, distortion, pixel size, pixel skew, and/or any other aspects of the imaging device 12.

In some other examples, the parameters for both intrinsic and extrinsic properties may be calibrated prior to delivery to the operator (e.g., at the factory, by the manufacturer or reseller, etc.), and the calibrated parameters are stored in a storage device. The parameters may be calibrated for multiple predetermined working distances. After the optical extensometer 10 is delivered to the operator and installed, the installer or operator may then adjust the imaging device 12 to verify that the working distance is configured properly (e.g., within a threshold range of the selected calibrated working distance) and make adjustments to the position and/or orientation of the imaging device 12 to correct for any deviations in position and/or orientation from the calibrated configuration. After calculating the calibration parameters (e.g., via the processor 202), the example processor 202 stores the calibration parameters (e.g., in the mass storage device 210). In some examples, the stored calibration parameters are related directly to the optics (e.g., lenses, lens mounting devices) and/or other specific components of the imaging device 12 to ensure that the stored calibration parameters are accurate at a later time.

Figure 5B:
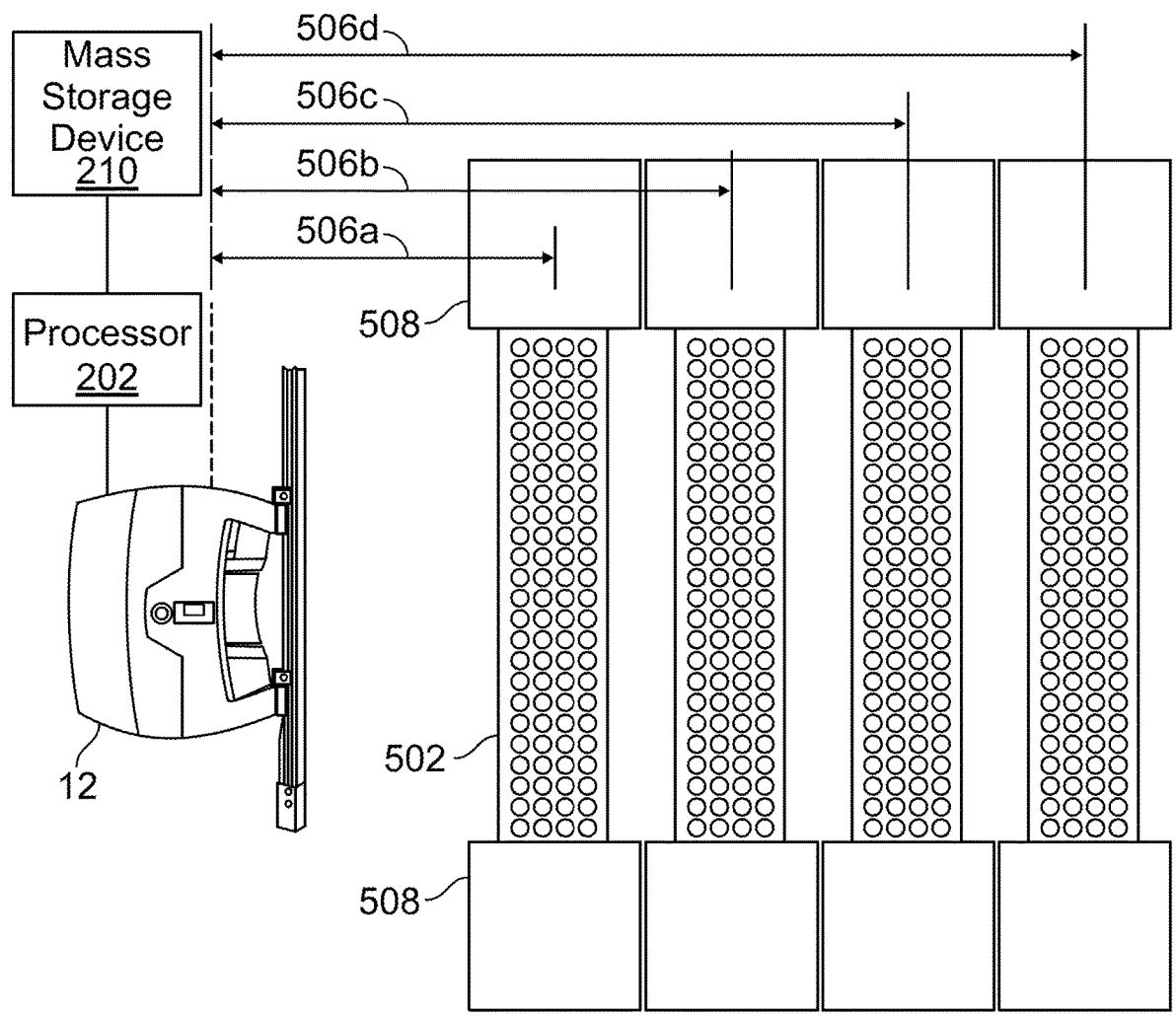
FIG. 5B illustrates an example arrangement of the imaging device of FIG. 1 and the calibration plate that may be used to calibrate the optical extensometer system for intrinsic properties and extrinsic properties at multiple predetermined working distances, and to store the resulting calibration parameters.

FIG. 5B illustrates an example arrangement of the imaging device 12 and the calibration plate 502 that may be used to calibrate the optical extensometer system 10 for intrinsic properties and extrinsic properties at multiple predetermined working distances 506a-506d, and store the calibration parameters. The example imaging device 12 is positioned at each of the working distances 506a-506d from the calibration plate 502. The calibration process illustrated in FIG. 5B is performed prior to delivery and installation of the optical extensometer 10. The calibration process may be similar to conventional calibration processes, such as observing a pattern of markers having known spacing and sizes on the calibration plate 502, and calculating the appropriate parameters to compensate for focal length, optical center, distortion, pixel size, pixel skew, and/or any other aspects of the imaging device 12, as well as extrinsic parameters such as the working distances 506a-506d.

In each of the example calibration processes of FIGS. 5A and 5B, the calibration plate 502 is installed in a load string 508, which may include the material fixturing 236, load cell 230, and/or the frame 228 of FIG. 2, and/or any other components involved in applying and/or measuring the load on a specimen during testing.

Figure 6A:
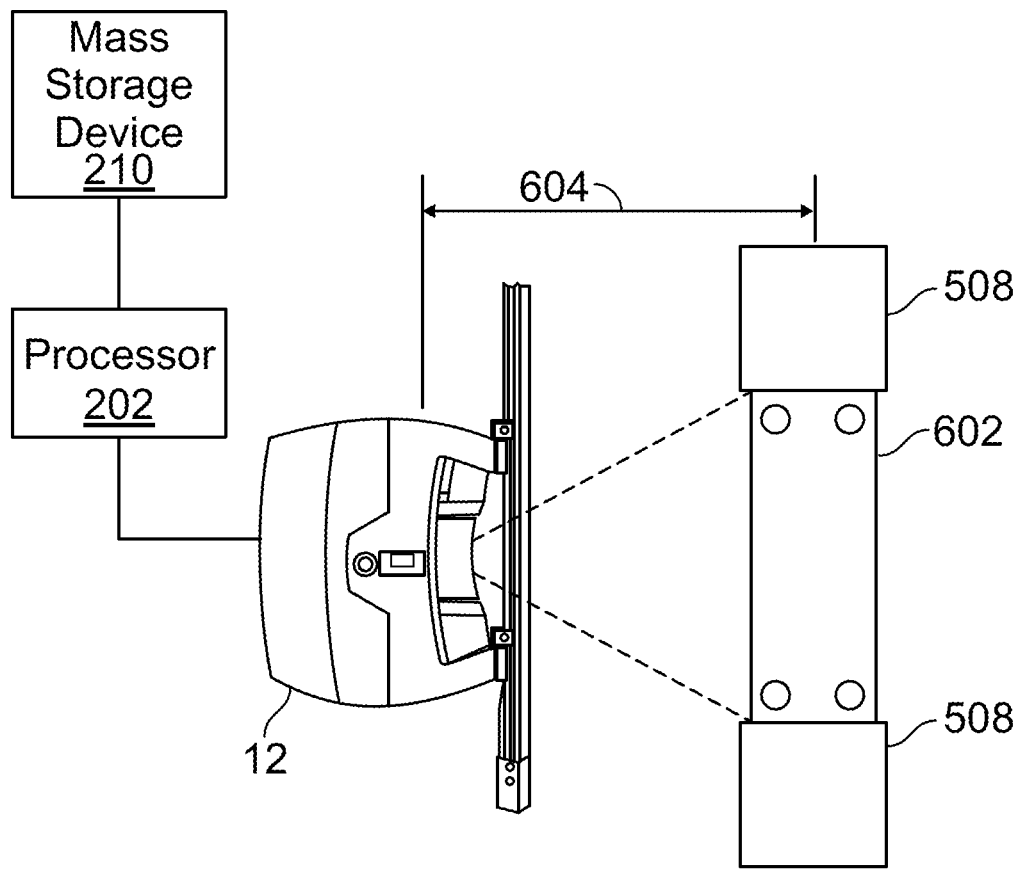
FIG. 6A illustrates an example arrangement of the imaging device of FIGS. 1, 5A, and/or 5B, and a verification plate that may be used to verify and adjust the calibration parameters associated with a configured working distance.

FIG. 6A illustrates an example arrangement of the imaging device 12 and a verification plate 602 that may be used to verify and adjust the calibration parameters associated with a configured working distance 604. The example imaging device 12 is shown in an installed configuration in FIG. 6A, in which the verification plate 602 is installed in the load string 508, which has been configured at installation to be the configured working distance 604 from the imaging device 12. In some other examples, rather than directly installing the verification plate 602 in the load string 508, the verification plate 602 may be attached to a specimen or other objected that is installed in the load string 508. For example, the verification plate 602 may be clamped or clipped (e.g., using spring clips or other types of clamps or clips) to a specimen that is installed in the load string 508. In some such examples, the verification plate 602 may include or be attached to a centering device to provide the desired positioning of the verification plate 602 within the field of view of the imaging device 12.

Because the intrinsic calibration parameters were previously calculated prior to installation, the example verification plate 602 used to determine the extrinsic calibration parameters may be smaller and/or simpler than the calibration plate 502 used to perform the calibration of the intrinsic calibration parameters. For example, the verification plate 602 be smaller and/or may include a smaller number of markers 606 than the calibration plate 502. The markers 606 have a precise, predetermined spatial relationship and size, to enable the processor 202 to measure (e.g., via the imaging device 12) and calculate the working distance 604, any other positional offset, and/or relative rotation between the imaging device 12 and the load string 508. Where the calibration plate 502 includes a larger number of the markers to enable a fuller calibration of the intrinsic aspects of the optics of the imaging device, the verification plate 602 has a limited number of the markers 606 due to the limited use of the verification plate 602 relative to the calibration plate 502.

While FIG. 6A illustrates an example verification plate 602, other verification plate designs may be used. For example, the size of the verification plate, size(s), shape(s), and/or position(s) of the markers, and/or any other aspects of the verification plate may be modified for the desired application. Additionally or alternatively, the verification process may be implemented using features projected onto a test specimen (e.g., via one or more lasers) or other surface coplanar with the load string 508, in which the imaging device 12 detects a distance between the projected feature(s) and/or objects having known positions, using a known projection angle, to determine the working distance 604.

The processor 202 uses the intrinsic calibration parameters stored on the mass storage device 210 to measure and calculate the extrinsic calibration parameters, such as determining the actual working distance 604 between the imaging device 12 and the load string 508 (e.g., the face plane of specimens to be tested via the load string). The processor 202 may then store the measured and calibrated extrinsic parameters in the mass storage device 210 (or other storage device of the optical extensometer 10) for use during measurement processes.

Figure 6B:
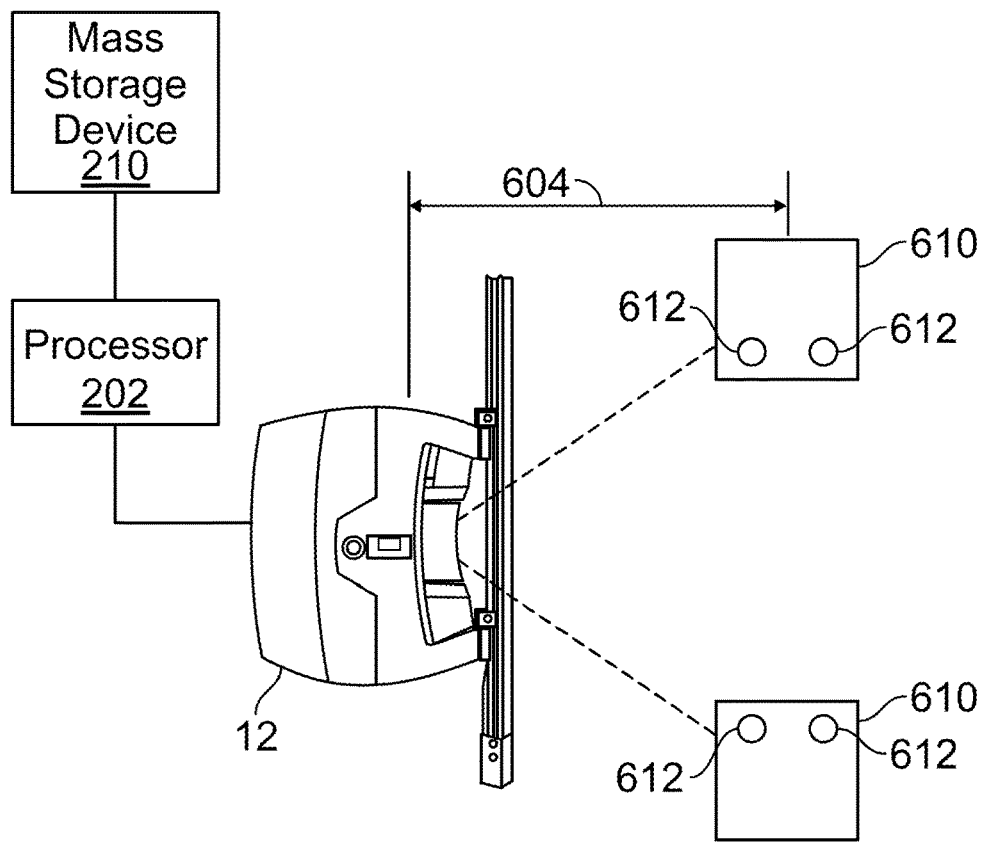
FIG. 6B illustrates another example arrangement of the imaging device of FIG. 5B and a load string having verification markers that may be used to verify and adjust the calibration parameters associated with a configured one of the predetermined working distances.

FIG. 6B illustrates another example arrangement of the imaging device 12 of FIG. 5B and a load string 610 having verification markers 612 that may be used to verify and adjust the calibration parameters associated with a configured one of the predetermined working distances. In contrast with the example of FIG. 6A, the verification markers 612 are positioned on the load string 610, such as on the grips 248, instead of a removable verification plate. As a result, the verification markers 612 remain on the load string 610, and may remain within the field of view of the imaging device 12 between and during measurement operations.

Figure 6C:
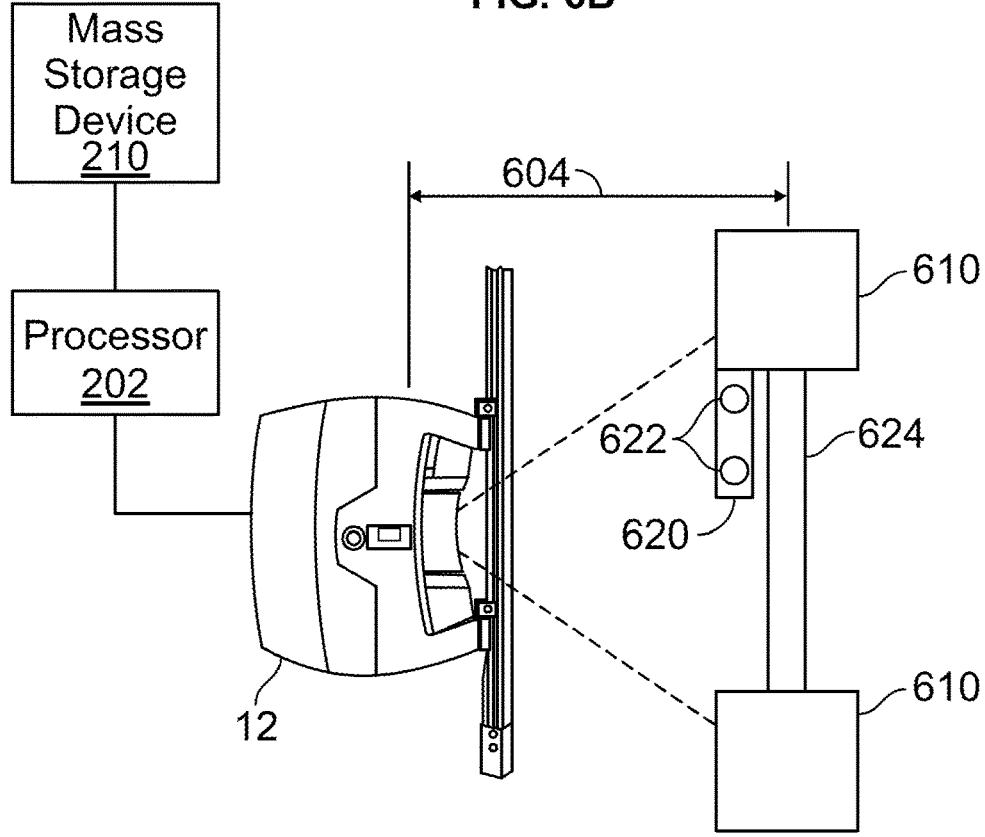
FIG. 6C illustrates an example arrangement of the imaging device of FIG. 6A and load string having verification markers that may be used to verify and adjust the calibration parameters associated with a configured one of the predetermined working distances.

FIG. 6C illustrates another example arrangement of the imaging device 12 of FIG. 5B and a reference tab 620 having verification markers 622 that may be used to verify and adjust the calibration parameters associated with a configured one of the predetermined working distances. The example reference tab 620 is installed into the load string 610 such that the face of the reference tab 620 having the markers 622 is coplanar with a specimen 624 being tested. Because the markers 622 are configured to be have a predetermined spacing and size(s), the imaging device 12 may determine and/or monitor (e.g., in real-time) the working distance 604, and/or any rotation and/or movement of the load string 610 during a test. One or more reference tabs 620 having any desired number and/or arrangement of the markers 622 may be used.

To enable the stored calibration parameters for the intrinsic properties to remain valid from the calibration procedure to delivery and installation, disclosed example imaging devices 12 include a kinematic mount to attach and detach one or more lenses to the imaging device 12 in a consistent and reproducible manner. The kinematic mount is both self-nesting and self-locating, and is not subject to variation in skill or technique between operators. Using the kinematic mount, example imaging devices 12 enable reproducibility of the precise position and orientation of the lens to ensure the validity of calibrated intrinsic parameters.

Figure 7:
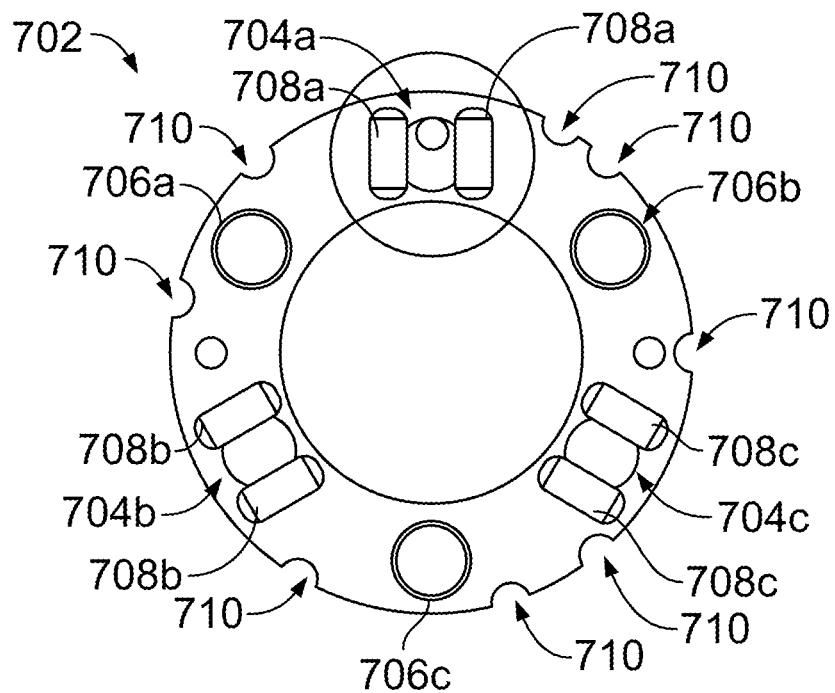
FIG. 7 is a plan view of an example base for a kinematic mounting system for a lens assembly of the example imaging device of FIG. 1.
Figure 8:
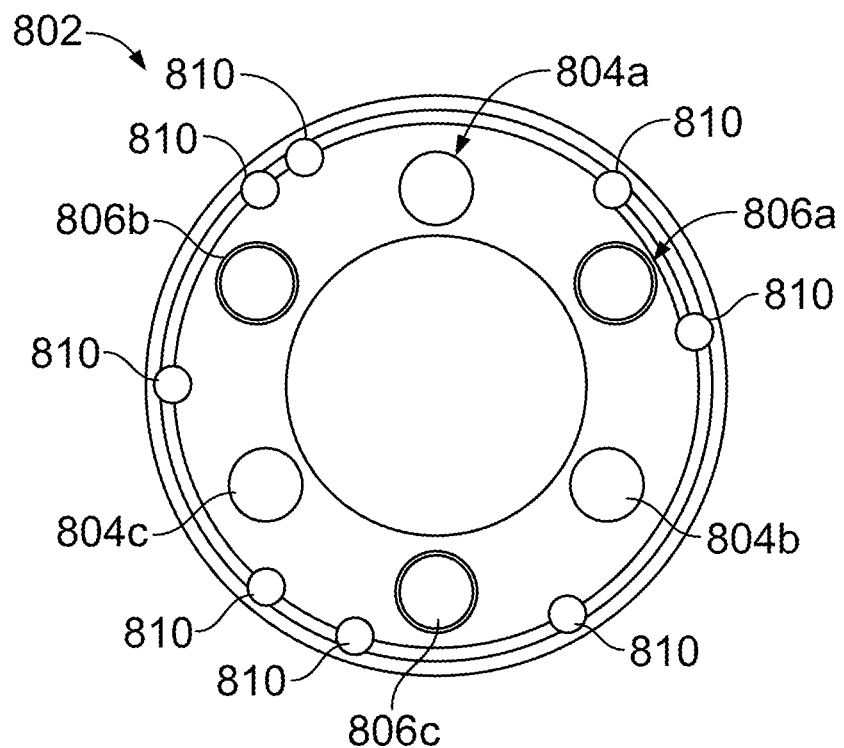
FIG. 8 is a plan view of an example lens mount for a kinematic mounting system for a lens assembly of the example imaging device of FIG. 1 which is configured to connect to the base of FIG. 7 in a precise and reproducible manner.
Figure 9:
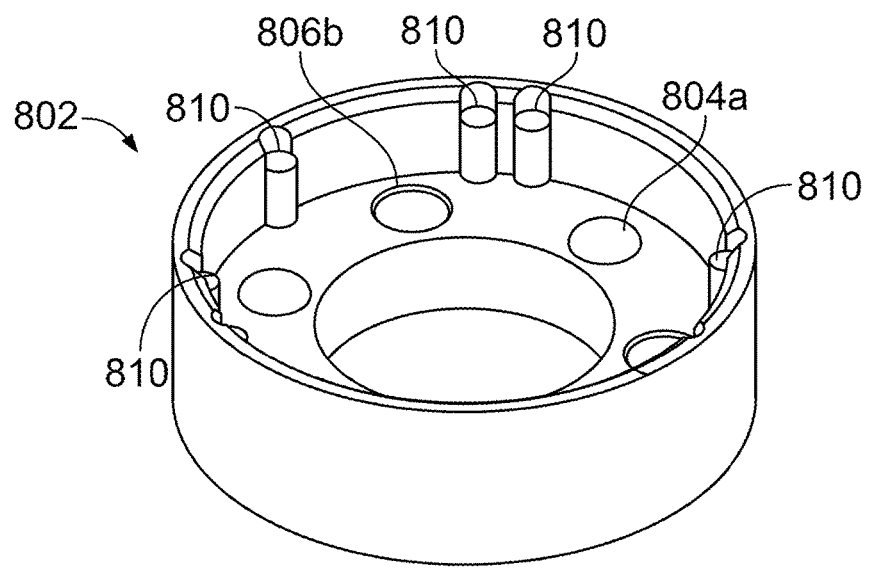
FIG. 9 is a perspective view of the example lens mount of FIG. 8.

FIG. 7 is a plan view of an example base 702 for a kinematic mounting system for a lens assembly of the example imaging device 12 of FIG. 1. The example base 702 is rigidly affixed to a housing of the imaging device 12, such that the base 702 has a fixed position with reference to an optical sensor of the imaging device 12 and/or with reference to the housing. FIG. 8 is a plan view of an example lens mount 802 for the kinematic mounting system for the lens assembly, which is configured to connect to the base of FIG. 7 in a precise and reproducible manner. A lens is affixed to the lens mount 802 to form a lens assembly, and the lens assembly is removable and replaceable in the imaging device 12. Additionally or alternatively, the lens mount 802 may allow for attachment of an optical filter, polarizer, and/or any other optical components for use with the optical sensor. FIG. 9 is a perspective view of the example lens mount 802 of FIG. 8.

Figure 10:
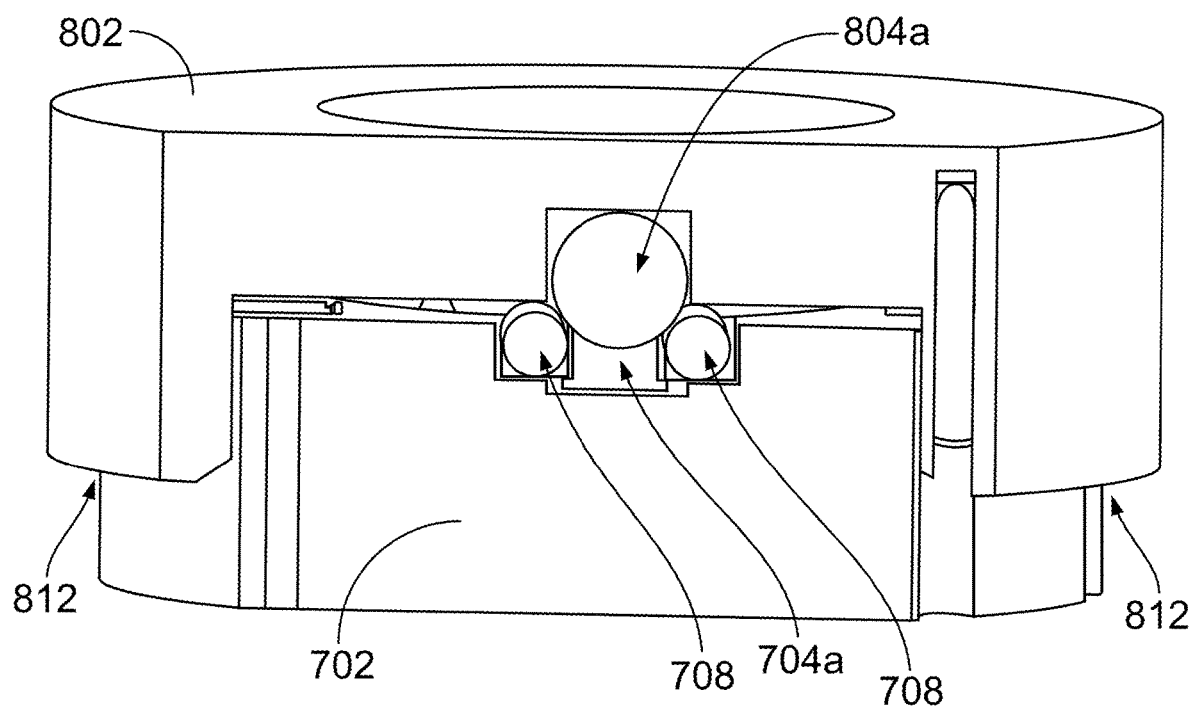
FIG. 10 is a sectional view of the lens mount and base of the example imaging assembly of FIGS. 7-9, illustrating nesting of a bearing of the lens mount with a seat of the base.

The base 702 includes a set of fixed seats 704a, 704b, 704c and a set of magnets 706a, 706b, 706c. The example seats 704a, 704b, 704c are spaced apart, and each include a set of parallel dowel pins 708a, 708b, 708c. In the example, the seats 704a, 704b, 704c are spaced 120 degrees apart, but may be spaced apart in any other desired configuration that supports the lens mount 802. Opposite the base 702, the lens mount 802 includes a set of bearings 804a, 804b, 804c and a set of magnets 806a, 806b, 806c. The magnets 706a, 706b, 706c and the magnets 806a, 806b, 806c provide at least a threshold nesting or clamping force to seat the bearings 804a, 804b, 804c into the seats 704a, 704b, 704c. The example bearings 804a, 804b, 804c have a complementary arrangement to the seats 704a, 704b, 704c, such that each of the bearings 804a, 804b, 804c is mated to a corresponding one of the seats 704a, 704b, 704c upon each installation. FIG. 10 is a sectional view of the lens mount 802 and base 702 of the example imaging assembly of FIGS. 7-9, illustrating nesting of a bearing 804a of the lens mount 802 within a seat 704a of the base 702.

The base 702 and the lens mount 802 may include keying features that prevent the bearings 804a, 804b, 804c from being installed into different ones of the seats 704a, 704b, 704c than in the arrangement at the time the calibration was performed. For example, the keying features may include dowels 810 and corresponding slots 710 which are arranged to only allow installation in a single angular orientation. In some examples, the keying features 710, 810 provide sufficient clearance to allow the bearings 804a, 804b, 804c to properly and fully nest into the seats 704a, 704b, 704c.

The example lens mount 802 further includes a skirt 812 reduces or blocks stray light from entering between the lens mount 802 and the base 702. In some other examples, a gasket, o-ring, and/or any other light-blocking technique may be used.

Depending on the materials used to implement the base 702 and the lens mount 802, one of the base 702 or the lens mount 802 may omit the associated magnets. In some other examples, the magnets may be replaced with other features or devices to provide the desired nesting force between the base 702 and the lens mount 802. For example, gravity may be used for vertically attached lens mounts 802 having a sufficient mass. In other examples, screws, springs, and/or other fastening devices may be used to attach the lens mount 802 to the base 702 with sufficient clamping force.

While the base 702 includes the seats 704a, 704b, 704c and the lens mount 802 includes the bearings 804a, 804b, 804c in the illustrated example of FIGS. 7 and 8, in other examples the base 702 may be configured with bearings configured to engage corresponding seats of the lens mount.

In some examples, the lens mount 802 may be provided with a wireless communication method, such as a radio frequency identifier (RFID) or near field communication (NFC) tag, or a wired communications device, such as a secure data storage chip or programmable read only memory (PROM), which may be readable by a corresponding reader on or near the base 702. In some examples, the bearings 804a-804c and dowel pins 708a-708c may provide electrical contacts for communication between a processor (e.g., the processor 202) and a data storage device on the lens mount 802, such that the processor is communicatively connected with the data storage device when the lens assembly is mounted to the imaging device 12.

The data storage device on the lens mount 802 may be provided with a serial number or other identifier which is securely read and stored with the first calibration parameters. In other examples, a user interface of the optical extensometer 10, remote control system (e.g., smartphone app, web interface, etc.), and/or any other user interface system, may request that the operator input a serial number or identifier that is printed, engraved, or otherwise marked on the lens assembly. In other examples, the identifier may be input into the optical extensometer 10 optically (e.g., via an optical sensor configured to read observable indicia on the lens mount 802 during and/or after installation of the lens mount 802), mechanically, electrically (e.g., via a unique resistor array for each unique optical sensor), and/or using any other technique.

At times subsequent to the intrinsic calibration, the data storage tag on the lens mount 802 may be read and compared to the identifier associated with intrinsic parameters to verify that the stored calibration parameters are valid for the installed lens assembly. If the incorrect lens assembly is installed (e.g., the entered identifier does not match the identifier associated with the calibration parameters), the optical extensometer 10 identifies the mismatch between the identifiers, and indicates that a new calibration process is required to ensure valid calibration.

Additionally or alternatively, the lens mount 802 may include visually identifiable markings which may be identified by the processor 202 via an image captured via the optical sensor of the imaging device 12. For example, any portion of the body 802 may be provided with a barcode, QR code, and/or any other visually identifiable marking. The marking contains or represents an encoded identifier and/or any other desired information, and may be placed within the field of view of the imaging device 12 during or prior to installation of the lens mount 802, at which time the processor 202 reads the markings and compares the observed identifier to an stored identifier associated with the stored calibration parameters, in a similar manner as described above.

The kinematic mount illustrated in FIGS. 7-10 ensures that orientation of the lens with respect to the optical sensor is consistent, which ensures that lens characteristics (e.g., distortions) always remain in the same orientation with respect to the optical sensor as during the calibration process to determine the intrinsic calibration parameters. Additionally, the nesting of the bearings against the dowel pins provides precise, repeatable axial location of the lens to consistently maintain lens focus when the lens assembly is attached.

While an example kinematic mount is illustrated in FIGS. 7-10, other kinematic mounts may be used. For example, the quantity, positioning, and/or types of seats and bearings may be modified. Similarly, the quantity, positioning, and/or types of keying features may be modified. For example, instead of dowels and slots for keying, an arrangement of the magnets may be selected such that only one orientation will result in engagement of the magnets. In other examples, the keying features may involve asymmetry of the base 702 and the lens mount 802.

The lens mount 802 may be provided with one or more features to allow the operator to grip the lens mount 802 for installation without touching the mounted lens. In some examples, the base 702 and/or the lens mount 802 include heat dissipation fins or other heat-dissipating features. The lens mount 802 and the base 702 may be constructed using any desired materials, such as metals, plastics, and/or ceramics.

Figure 11C:
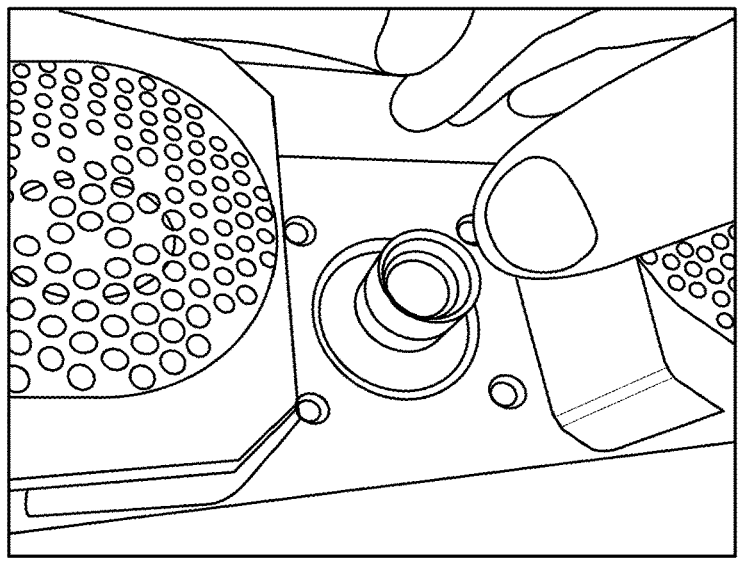
FIGS. 11A-11C illustrate an example progression of a reproducible installation of the lens mount of FIG. 8 onto the base of FIG. 7.
Figure 11B:
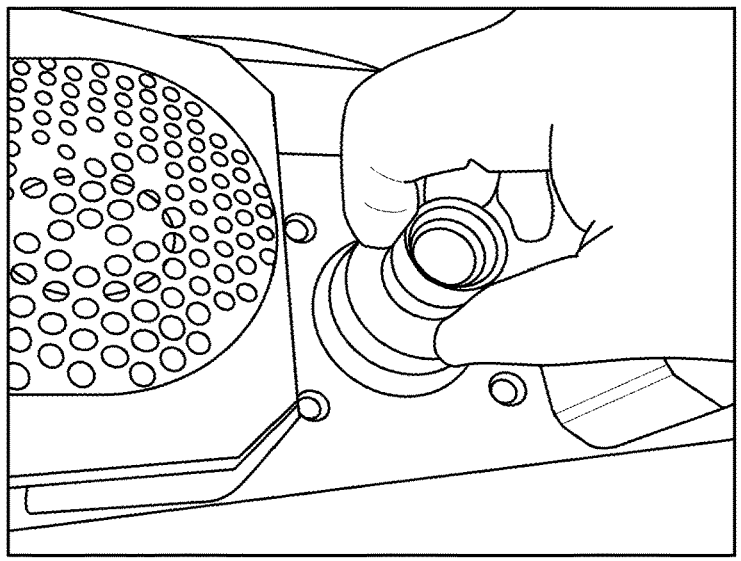
Figure 11A:
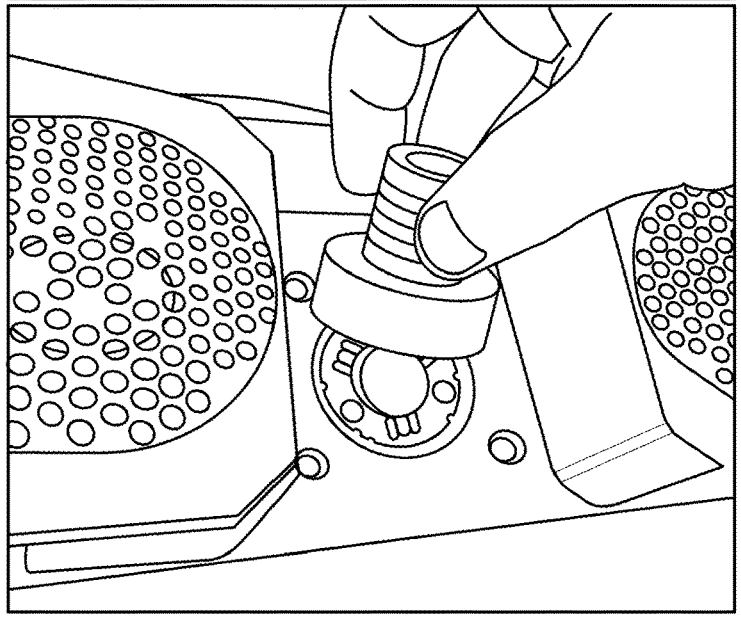

FIGS. 11A-11C illustrate an example progression of a reproducible installation of the lens mount 802 of FIG. 8 onto the base 702 of FIG. 7. As shown in FIG. 11A, the lens mount 802 is brought towards the base 702. The lens mount 802 may require rotation (FIG. 11B) so that the keying features 710, 810 permit full installation of the lens mount 802 onto the base 702. When the keying features 710, 810 are mated and the lens mount 802 comes within a threshold distance of the base 702, the opposing magnets 706a-706c, 806a-806c create sufficient attraction force to mate the lens mount 802 onto the base 702 and seat the bearings 804a-804c into corresponding ones of the seats 704a-704c. The magnets 706a-706c, 806a-806c provide a consistent mating force between the bearings 804a-804c and the seats 704a-704c to provide a consistent seating or nesting depth of the bearings 804a-804c into the seats 704a-704c, which is immune to technique or capability of the operator.

FIG. 12A illustrates an example of the imaging device 12 including an adjustable imaging device mount 1202 attached to an interior of a housing 1204 for adjustment of the positioning and/or rotation of an optical sensor 1206 and lens assembly 1208 of the imaging device 12. The housing 1204 contains the optical sensor 1206 of the imaging device 12, and the lens assembly 1208 is attached to the housing 1204. The lens assembly 1208 may be implemented by the example base 702 and lens mount 802 of FIGS. 7-10. The lens assembly 1208, when installed, has a fixed distance to the optical sensor 1206 (e.g., for validity of calibrated parameters).

The housing 1204 is physically attached to a support structure, such as a support rail 1210. The support rail 1210 has a fixed position with respect to the load string of the optical extensometer 10. As a result, the housing 1204 also has a fixed position with respect to the load string. The example adjustable imaging device mount 1202 is attached between the optical sensor 1206 and the housing 1204, and enables manual (or automatic) adjustment of the physical position and/or orientation of the optical sensor 1206 and the lens assembly 1208 with reference to the load string, which permits adjustment of the working distance (e.g., the working distance 604 of FIG. 6A), particularly during the extrinsic verification process in which the calibrated working distance (e.g., one of the multiple working distances 506a-506d) is configured and verified. The adjustable imaging device mount 1202 may include, for example, adjustment screws (e.g., jackscrews) that can be manipulated to adjust the working distance and/or other positioning and/or rotational aspects.

FIG. 12B illustrates another example of the imaging device 12 including an adjustable imaging device mount 1212 attached to an exterior of the housing 1204 for adjustment of the positioning and/or rotation of the optical sensor 1206 and lens assembly 1208 of the imaging device 12. In the example of FIG. 12B, the adjustable imaging device mount 1212 is connected between the housing 1204 and the support rail 1210 (or other support structure). As a result, the adjustable imaging device mount 1212 is configured to adjust the position with respect to the load string (e.g., working distance) and/or orientation of the optical sensor 1206 by adjusting the housing 1204.

The example adjustable imaging device mount 1212 enables manual (or automatic) adjustment of the physical position and/or orientation of the optical sensor 1206 and the lens assembly 1208 with reference to the load string, which permits adjustment of the working distance (e.g., the working distance 604 of FIG. 6A), particularly during the extrinsic verification process in which the calibrated working distance (e.g., one of the multiple working distances 506a-506d) is configured and verified. The adjustable imaging device mount 1212 may include, for example, adjustment screws (e.g., jackscrews) that can be manipulated to adjust the working distance and/or other positioning and/or rotational aspects.

In some other examples, the working distance, focal distance, and/or other position or orientation adjustments could be made using spacers or other techniques to effect physical adjustments. In some examples, the adjustments could be performed by a dial, in which turning the dial causes the optical sensor or base 702 of the lens assembly 1208 to travel along a screw. In some examples, the dial may include multiple detents to allow the operator to dial the lens assembly 1208, base 702, or optical sensor to one of multiple discrete adjustment points. As an example, the base 702 may be dialed to a desired distance from the optical sensor to adjust the focal distance for a desired working distance.

Figures 13, 14:
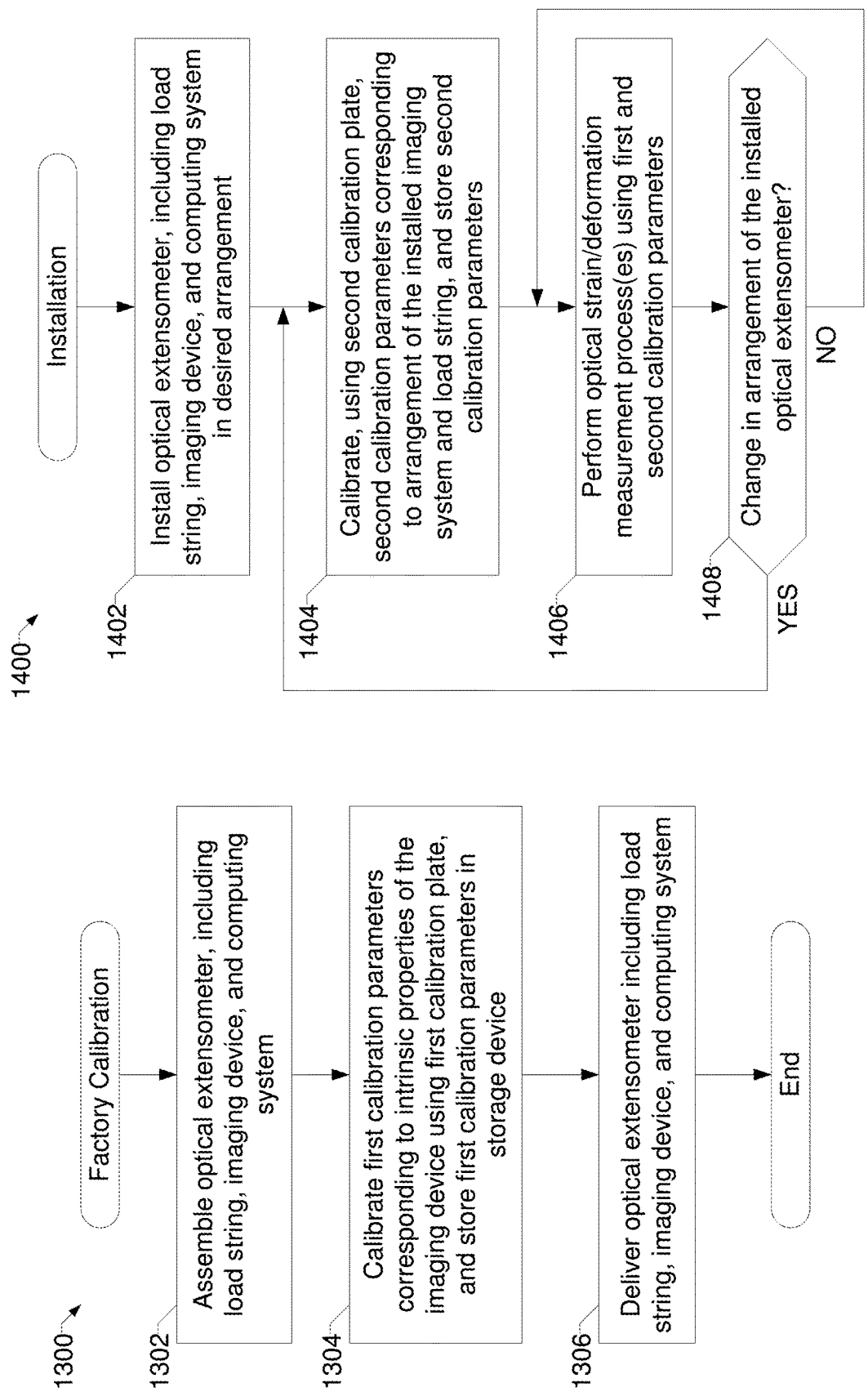
FIG. 13 is a flowchart representative of an example method which may be performed to determine and store intrinsic calibration parameters for the extensometer system of FIG. 1.
FIG. 14 is a flowchart representative of an example method which may be performed to determine and extrinsic second calibration parameters for the extensometer system of FIG. 1 based on calibration parameters.

FIG. 13 is a flowchart representative of an example method 1300 which may be performed to determine and store intrinsic calibration parameters for the optical extensometer system 10 of FIG. 1. The example method 1300 is performed prior to delivery installation of the optical extensometer system 10 to determine at least intrinsic calibration parameters. The method 1300 is described below with reference to the example optical extensometer 10 of FIGS. 5A and 6A, but may be performed using other optical extensometer systems.

At block 1302, an operator assembles the optical extensometer 10, including a load string (e.g., the load string 508 of FIG. 5A), an imaging device (e.g., imaging device 12 at a working distance 504 from the load string 508), and a computing system (e.g., the computing device 32 of FIG. 4). Assembly of the imaging device 12 may include, for example, installing a lens assembly onto a base using a kinematic mount. Assembly may further include installing a calibration plate (e.g., the calibration plate 502 of FIG. 5A) onto the load string 508.

At block 1304, the optical extensometer 10 calibrates (e.g., via the processor 202 of FIG. 5A) first calibration parameters corresponding to intrinsic properties of the imaging device 12 using the calibration plate 502, and stores the first calibration parameters in a storage device (e.g., the mass storage device 210). For example, the processor 202 may determine and store calibration parameters for one or more of a focal length of the imaging device 12, an optical center of the imaging device 12, distortion parameter(s), pixel size(s) of the imaging device 12, and/or parameter(s) representative of pixel skew in the imaging device 12.

At block 1306, the optical extensometer 10 is delivered to the user. The delivered optical extensometer 10 includes the imaging device 12, including the same lens assembly used during calibration, and the computing device 32 including the storage device containing the calibration parameters. In some examples, the delivered optical extensometer 10 also includes the load string used during calibration. In other examples, the load string may be different in the delivered system than during the calibration. The example method 1300 then ends.

Upon delivery, the optical extensometer 10 is installed and further calibrated using the pre-calibrated intrinsic parameters. FIG. 14 is a flowchart representative of an example method 1400 which may be performed to determine and second, extrinsic calibration parameters for the optical extensometer system 10 of FIG. 1 based on the first, intrinsic calibration parameters. The method 1400 is described below with reference to the example optical extensometer 10 of FIGS. 5A and 6A, but may be performed using other optical extensometer systems.

At block 1402, the optical extensometer 10, including the load string 508, the imaging device 12, and the computing device 32, is installed in the desired arrangement. For example, the imaging device 12 and the load string 508 may be arranged at a desired working distance 604.

At block 1404, the optical extensometer 10 (e.g., via the processor 202) calibrates, using a second calibration plate (e.g., the verification plate 602 of FIG. 6A) and the stored first calibration parameters in the storage device, second calibration parameters corresponding to the arrangement of the installed optical extensometer 10. The processor 202 stores the second calibration parameters. In the example method 1400, the second calibration parameters are related to extrinsic factors, such as the specific arranged working distance 604, any other positional offset between the imaging device 12 and the load string 508, and/or any rotation between the imaging device 12 and the load string 508.

At block 1406, an operator may perform optical deformation or strain measurement processes using the first and second calibration parameters.

At block 1408, the operator or processor 202 may determine whether a change in arrangement of the installed optical extensometer 10 has occurred. For example, the processor 202 may identify one or more factors indicating that the working distance 604 (e.g., via monitoring a reference tab or similar device) or other aspects of the system have changed, or the operator may indicate that such changes have occurred via a user interface.

If a change in arrangement has not been detected (block 1408), control returns to block 1406 to continue performing measurement processes. When a change in arrangement has occurred (block 1408), control returns to block 1404 to perform the calibration of the second calibration parameters again.

FIG. 15 is a flowchart representative of an example method 1500 which may be performed to determine and store intrinsic and extrinsic calibration parameters for the extensometer system of FIG. 1. The example method 1300 is performed prior to delivery installation of the optical extensometer system 10 to determine at least intrinsic calibration parameters. The method 1500 is described below with reference to the example optical extensometer 10 of FIGS. 5B and 6A, but may be performed using other optical extensometer systems.

At block 1502, an operator assembles the optical extensometer 10, including a load string (e.g., the load string 508 of FIG. 5B), an imaging device (e.g., imaging device 12 at a working distance 506a-506d from the load string 508), and a computing system (e.g., the computing device 32 of FIG. 4). Assembly of the imaging device 12 may include, for example, installing a lens assembly onto a base using a kinematic mount. Assembly may further include installing a calibration plate (e.g., the calibration plate 502 of FIG. 5B) onto the load string 508.

At block 1504, the optical extensometer 10 calibrates (e.g., via the processor 202 of FIG. 5A) multiple sets of first calibration parameters, corresponding to intrinsic properties of the imaging device 12, using the calibration plate 502 set at multiple predetermined working distances 506a-506d, and stores the first calibration parameters in a storage device (e.g., the mass storage device 210). For example, the processor 202 may determine and store calibration parameters for one or more of a focal length of the imaging device 12, an optical center of the imaging device 12, distortion parameter(s), pixel size(s) of the imaging device 12, and/or parameter(s) representative of pixel skew in the imaging device 12, for each of the desired working distances 506a-506d.

At block 1506, the optical extensometer 10 is delivered to the user. The delivered optical extensometer 10 includes the imaging device 12, including the same lens assembly used during calibration, and the computing device 32 including the storage device containing the calibration parameters. In some examples, the delivered optical extensometer 10 also includes the load string used during calibration. In other examples, the load string may be different in the delivered system than during the calibration. The example method 1500 then ends.

Upon delivery, the optical extensometer 10 is installed and the selected one of the predetermined working distances 506a-506d is verified using the pre-calibrated intrinsic and extrinsic parameters. FIG. 16 is a flowchart representative of an example method 1600 which may be performed to verify the configuration of the installed optical extensometer system 10 of FIG. 1 based on the stored intrinsic and extrinsic calibration parameters. The method 1600 is described below with reference to the example optical extensometer 10 of FIGS. 5B and 6A, but may be performed using other optical extensometer systems.

At block 1602, the optical extensometer 10, including the load string 508, the imaging device 12, and the computing device 32, is installed in the desired arrangement. For example, the imaging device 12 and the load string 508 may be arranged at one of the predetermined working distances 506a-506d which were calibrated prior to installation (e.g., by the manufacturer).

At block 1604, the optical extensometer 10 (e.g., via the processor 202) verifies, using a second calibration plate (e.g., the verification plate 602 of FIG. 6A) and the stored first calibration parameters in the mass storage device 210, the second calibration parameters corresponding to the arrangement of the installed optical extensometer 10. For example, the processor 202 may measure the current working distance and provide an indication to allow an operator or installer to adjust the working distance (e.g., via an adjustable imaging device mount 1202, 1212 of FIGS. 12A and/or 12B) to accurately configure the selected working distance (e.g., within a threshold range), and/or any other position and/or orientation adjustments.

At block 1606, an operator may perform optical deformation or strain measurement processes using the first and second calibration parameters.

At block 1608, the operator or processor 202 may determine whether a change in arrangement of the installed optical extensometer 10 has occurred. For example, the processor 202 may identify one or more factors indicating that the working distance 604 (e.g., via monitoring a reference tab or similar device) or other aspects of the system have changed, or the operator may indicate that such changes have occurred via a user interface.

If a change in arrangement has not been detected (block 1608), control returns to block 1606 to continue performing measurement processes. When a change in arrangement has occurred (block 1608), control returns to block 1604 to verify the arranged working distance again.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit, chip, or circuit implementing logic. Some implementations may comprise a non-transitory machine-readable (e.g., computer-readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine-readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}.

In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An optical extensometer, comprising:
   a load string configured to secure a test specimen;
   an imaging device configured to capture images of a surface of the test specimen when secured in the load string;
   a storage device configured to store a plurality of first calibration parameters corresponding to intrinsic properties of the imaging device; and
   control circuitry configured to:
      perform a verification process using the first calibration parameters to verify that a plurality of second calibration parameters correspond to an arrangement of the test specimen with respect to the imaging device; and
      perform an optical strain measurement process to measure displacement of the test specimen based on the first calibration parameters and the second calibration parameters.

2. The optical extensometer as defined in claim 1, wherein the imaging device comprises a housing, an image sensor within the housing, and a lens configured to attach to the housing using a kinematic mount.

3. The optical extensometer as defined in claim 2, wherein the kinematic mount is configured to reproduce a position and orientation of the lens corresponding to a calibration procedure associated with generation of the first calibration parameters.

4. The optical extensometer as defined in claim 2, wherein the kinematic mount comprises:
   a base, comprising a plurality of seats; and
   a lens mount, comprising a plurality of bearings having a complementary arrangement to the plurality of seats.

5. The optical extensometer as defined in claim 4, wherein the base and the lens mount further comprise complementary keying to prevent mismatching of the plurality of bearings with the plurality of seats.

6. The optical extensometer as defined in claim 4, wherein the base comprises a plurality of first magnets, and the lens mount comprises a plurality of second magnets configured to interact with the first magnets to mate the plurality of bearings to the plurality of seats.

7. The optical extensometer as defined in claim 1, further comprising an adjustable imaging device mount configured to enable adjustment of a working distance between the imaging device and the load string.

8. The optical extensometer as defined in claim 7, wherein the imaging device comprises a housing, an optical sensor within the housing, and a lens mount having a fixed distance to the optical sensor, wherein the adjustable imaging device mount is attached to an exterior of the housing.

9. The optical extensometer as defined in claim 7, wherein the imaging device comprises a housing, an optical sensor within the housing, and a lens mount having a fixed distance to the optical sensor, wherein the adjustable imaging device mount is attached to an interior of the housing and is configured to adjust a position of the optical sensor and the lens mount.

10. The optical extensometer as defined in claim 7, wherein the control circuitry is configured to perform the verification process and output a signal indicating whether the working distance is within a threshold range of one or more predetermined working distances.

11. The optical extensometer as defined in claim 1, wherein the control circuitry is configured to calculate the second calibration parameters based on the first calibration parameters and using a predetermined verification specimen attached to the load string.

12. The optical extensometer as defined in claim 1, wherein the intrinsic properties of the imaging device comprise one or more of: a focal length, an optical center, a distortion parameter, a pixel size, or a pixel skew parameter.

13. The optical extensometer as defined in claim 1, wherein the second calibration parameters comprise a relative position of the imaging device and the load string with respect to a reference position, and a relative rotation of the imaging device and the load string with respect to a reference orientation.

14. The optical extensometer as defined in claim 1, wherein the control circuitry is configured to perform the verification process based on a predetermined calibration plate placed in the load string.

15. The optical extensometer as defined in claim 1, wherein the control circuitry is configured to perform the verification process based on reference markers installed on the load string.

16. The optical extensometer as defined in claim 1, further comprising an adjustable imaging device mount configured to enable adjustment of a focal distance by adjusting a distance between a lens and an optical sensor of the imaging device, the adjustable imaging device mount comprising a plurality of discrete adjustment points.

17. The optical extensometer as defined in claim 1, wherein the storage device is configured to store an identifier corresponding to at least one component of the imaging device, the identifier being stored in association with the first calibration parameters, and the control circuitry is configured to perform the verification process using the first calibration parameters based on accessing the first calibration parameters in response to receiving the identifier at the control circuitry.

18. The optical extensometer as defined in claim 17, further comprising a communications device configured to receive the identifier from at least one of a removable lens of the imaging device or a remote control system.

19. The optical extensometer as defined in claim 18, wherein the communications device is configured to receive the identifier from the removable lens via at least one of a radio frequency identifier (RFID), a near field communication (NFC) tag, a secure data storage chip, or a programmable read only memory (PROM).

20. The optical extensometer as defined in claim 18, wherein the control circuitry is configured to, in response to determining that the received identifier does not match the identifier stored in association with the first calibration parameters, identify a mismatch and indicate that a new calibration process is required.

21. The optical extensometer as defined in claim 1, wherein the control circuitry is configured to select, based on performing the verification process, one of a plurality of sets of the second calibration parameters stored in the storage device corresponding to a plurality of predetermined working distances.

* * * * *